(12) United States Patent
Meng et al.

(10) Patent No.: US 12,603,339 B2
(45) Date of Patent: Apr. 14, 2026

(54) ENERGY STORAGE APPARATUS

(71) Applicant: Huawei Digital Power Technologies Co., Ltd., Shenzhen (CN)

(72) Inventors: Hao Meng, Dongguan (CN); Zhipeng Wu, Shenzhen (CN); Hui Ma, Shenzhen (CN)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 788 days.

(21) Appl. No.: 17/875,916

(22) Filed: Jul. 28, 2022

(65) Prior Publication Data

US 2023/0033839 A1 Feb. 2, 2023

(30) Foreign Application Priority Data

Jul. 30, 2021 (CN) .......................... 202110879476.7

(51) Int. Cl.
*H01M 10/613* (2014.01)
*H01M 10/6556* (2014.01)
*H01M 10/6565* (2014.01)
*H01M 10/6566* (2014.01)

(52) U.S. Cl.
CPC ..... *H01M 10/613* (2015.04); *H01M 10/6556* (2015.04); *H01M 10/6565* (2015.04); *H01M 10/6566* (2015.04)

(58) Field of Classification Search
CPC ............. H01M 10/613; H01M 10/617; H01M 10/627; H01M 10/6556; H01M 10/6557; H01M 10/625; H01M 10/6563; H01M 10/6565; H01M 10/6566; H01M 50/204; H01M 50/209; H01M 2220/20
See application file for complete search history.

(56) References Cited

U.S. PATENT DOCUMENTS

2014/0363719 A1* 12/2014 Kwak .................. H01M 10/625
429/120
2015/0060164 A1 3/2015 Wang et al.
(Continued)

FOREIGN PATENT DOCUMENTS

CN 206451742 U 8/2017
CN 209418721 U 9/2019
CN 211017322 U 7/2020
(Continued)

*Primary Examiner* — Brian R Ohara
*Assistant Examiner* — Brent C Thomas
(74) *Attorney, Agent, or Firm* — Maier & Maier, PLLC

(57) ABSTRACT

An energy storage apparatus includes a cabinet, cyclic cooling units, a support, battery modules, and an air supply duct. The support is fastened in an inner cavity of the cabinet, the battery modules are fastened on the support, and the support and the battery modules jointly separate the inner cavity into an air intake region and an air return region. A heat dissipation duct communicating with the air intake region and the air return region is disposed in the battery module. The cyclic cooling unit is located outside the cabinet and includes an air inlet vent and an air return vent. One end of the air supply duct communicates with the air inlet vent, and the other end of the air supply duct communicates with the air intake region. The air return vent communicates with the air return region.

16 Claims, 23 Drawing Sheets

(56)  References Cited

U.S. PATENT DOCUMENTS

2015/0380781 A1* 12/2015 Steinmeyer ......... H01M 10/486
                                                            429/50
2017/0077467 A1*  3/2017 Kronke .............. H01M 10/647

FOREIGN PATENT DOCUMENTS

| CN | 212062489 | U |   | 12/2020 |
|----|-----------|---|---|---------|
| CN | 212161902 | U | * | 12/2020 |
| CN | 112968245 | A |   | 6/2021  |
| EP | 0907981   | B1 |  | 11/2000 |
| GB | 2589227   | B |   | 7/2022  |

* cited by examiner

300

312    313    314

4011

402

402

4011

43

4012

44

451

4012

451

43

46

311

ENERGY STORAGE APPARATUS

CROSS-REFERENCE TO RELATED APPLICATION

This application claims priority to Chinese Patent Application No. 202110879476.7, filed on Jul. 30, 2021, which is hereby incorporated by reference in its entirety.

TECHNICAL FIELD

The embodiments relate to the power and energy field, and an energy storage apparatus.

BACKGROUND

A battery energy storage apparatus has high flexibility, reliability, and energy density, and is gradually applied to fields such as large-scale photovoltaic power generation and wind power generation, to resolve a problem of large intermittent fluctuation of power generation. However, battery modules in the energy storage apparatus are generally arranged densely. This is not conducive to overall heat dissipation of the energy storage apparatus. The battery module works at a high temperature for a long time, leading to a decrease of a service life of the battery module.

SUMMARY

The embodiments may provide an energy storage apparatus, to ensure a high cabinet deployment rate of a battery module and achieve a good heat dissipation effect.

An energy storage apparatus is provided, and includes a cabinet, cyclic cooling units, a support, battery modules, and an air supply duct. The support is fastened in an inner cavity of the cabinet, the battery modules are fastened on the support, and the support and the battery modules jointly separate the inner cavity into an air intake region and an air return region. A heat dissipation duct is disposed in the battery module, and the heat dissipation duct communicates with the air intake region and the air return region. The cyclic cooling unit is located outside the cabinet and is nearer the air return region than the air intake region. The cyclic cooling unit includes an air inlet vent and an air return vent. One end of the air supply duct communicates with the air inlet vent, and the other end of the air supply duct communicates with the air intake region. The air return vent communicates with the air return region. The cyclic cooling unit is configured to supply cooling gas from the air inlet vent. The cooling gas successively passes through the air supply duct, the air intake region, the heat dissipation duct, and the air return region, and finally flows back to the cyclic cooling unit from the air return vent.

According to the embodiments, the battery modules may be fastened by using the support, and a fixing structure of the support and the battery modules may separate the inner cavity of the cabinet into the air intake region and the air return region. Then, the cyclic cooling unit is fastened outside the cabinet, so that the air inlet vent and the air return vent of the cyclic cooling unit are disposed toward the inner cavity. In this way, the air return vent communicates with the air return region, and the air inlet vent communicates with the air intake region through the air supply duct. Cooling gas supplied by the cyclic cooling unit may flow from the air inlet vent to the air intake region through the air supply duct or may flow back from the air return region to the cyclic cooling unit through the air return vent.

Between the air intake region and the air return region, cooling gas flows through the heat dissipation duct in the battery module. Cooling gas with a low temperature in the air intake region may flow into the battery module, and then flow into the air return region after being fully in contact with, in the heat dissipation duct, gas with a high temperature in the battery module. Subsequently, the cooling gas with an increased temperature is cooled again in the cyclic cooling unit and enters the air intake region again.

According to the embodiments, a flow path for the cooling gas in the inner cavity may be configured so that the cooling gas can flow back only by passing through the heat dissipation duct of the battery module. Therefore, the energy storage apparatus may achieve a better dissipation effect. This can better control a working temperature of the battery module, ensure working reliability of the battery module, and further prolong a service life of the battery module.

In a possible implementation, the cyclic cooling unit and the air intake region are disposed on two opposite sides of the air return region. The air supply duct is disposed across a top of the support and communicates with the air inlet vent and the air intake region.

In this implementation, the air supply duct crosses the top of the support, and the air supply duct may be formed by using a partial structure of the inner cavity. In addition, the air supply duct is disposed at a top position of the inner cavity. This can lower a height of the support, and facilitate installation, dismantlement, and maintenance of the battery module on the support.

In a possible implementation, the cabinet further includes a cabinet door, and the cyclic cooling unit is fastened on the cabinet door. The air supply duct includes a fixed section and a movable section. The fixed section is fastened on the top of the support, and the movable section is fastened on the cabinet door and communicates with the air inlet vent.

In this implementation, the energy storage apparatus needs to reserve space for opening and closing the cabinet door. Therefore, the cyclic cooling unit is fastened on cabinet door. This properly uses space outside the cabinet door and avoids that cyclic cooling units installed on other positions outside the cabinet occupy extra outside space. The fixed section of the air supply duct is fastened on the top of the support, so that relative positions of the air supply duct and the air intake region can be maintained. The movable section is fastened on the cabinet door, so that relative positions of the air supply duct and the cyclic cooling unit are maintained. When the cabinet door is closed, relative positions of the movable section and the fixed section are fixed, to ensure function implementation of the air supply duct.

In a possible implementation, an adhesive strip for sealing is further disposed at a fitting position between the fixed section and the movable section.

In a possible implementation, there are at least two cyclic cooling units, and the at least two cyclic cooling units are disposed side by side in a first direction. The air supply duct includes at least two sub-ducts, the at least two sub-ducts are also disposed side by side in the first direction, and each sub-duct correspondingly communicates with an air inlet vent of one cyclic cooling unit.

In this implementation, when there are many battery modules accommodated in the energy storage apparatus, a size of the support is large, and a plurality of cyclic cooling units may be disposed to provide more cooling gas. The plurality of cyclic cooling units may be disposed side by side. Each sub-duct correspondingly communicates with one cyclic cooling unit. This structure ensures that cooling gas supplied by each cyclic cooling unit is transported into the air intake region.

In a possible implementation, a side air deflector plate is disposed between two adjacent sub-ducts.

In this implementation, the side air deflector plate can prevent exchange of cooling gas between the two sub-ducts, and also prevent a phenomenon that cooling gas flows back from one sub-duct to the other sub-duct.

In a possible implementation, a mixed-flow fan is disposed between two adjacent sub-ducts and is bidirectionally rotatable. The mixed-flow fan is configured to supply cooling gas in one sub-duct to the other sub-duct, to balance temperatures of the two adjacent sub-ducts.

In this implementation, when temperatures of cooling gas in the two sub-ducts are different, exchange of the cooling gas in the two adjacent sub-ducts may be actively controlled by using the mixed-flow fan, to eliminate a temperature difference between the two sub-ducts. In this way, temperature consistency of the cooling gas in the air intake region is ensured, and heat dissipation effects achieved by all battery modules tend to be consistent.

In a possible implementation, there are a plurality of battery modules, and the plurality of battery modules are fastened on the support at intervals. The battery module includes an air outlet surface facing the air return region. The heat dissipation duct includes an air outlet end, and the air outlet end is disposed on the air outlet surface.

In this implementation, the air outlet end of the heat dissipation duct is located on the air outlet surface of the battery module, so that the cooling gas can directly enter the air return region after passing through the heat dissipation duct. This avoids a case in which cooling gas flowing out of the heat dissipation duct flows back to the air intake region, and consequently, a temperature of the air intake region is increased and the heat dissipation effect is affected.

In a possible implementation, the battery module is rectangular. The battery module further includes an air inlet surface opposite to the air outlet surface, and four side surfaces connected between the air outlet surface and the air outlet surface. The heat dissipation duct includes an air inlet end opposite to the air outlet end, and the air inlet end is located on the air inlet surface and/or the side surface.

In this implementation, the plurality of battery modules may be disposed at intervals, so that the air inlet surface and the four side surfaces of the battery module are in an open and unobstructed state. When cooling gas enters the heat dissipation duct from a plurality of positions, a cooling effect of the cooling gas on the battery module is accordingly improved.

In a possible implementation, a baffle plate is further disposed between the support and the air outlet surface of the battery module.

In this implementation, the baffle plate may seal a gap between the support and the battery module, so that gas with a high temperature in the air return region does not flow back to the air intake region through the air outlet surface of the battery module. In this way, the air intake region and the air return region are sealed and separated. The cooling gas can flow back to the air return region through only the heat dissipation duct of the battery module.

In a possible implementation, the support includes a first support and a second support, and the first support and the second support are disposed at intervals. The battery modules are fastened on each of the first support and the second support, and the air intake region is formed between the first support and the second support. The air return region further includes a first air return region and a second air return region. The first air return region is located on a side that is of the first support and that is away from the second support, and the second air return region is located on a side that is of the second support and that is away from the first support. The cyclic cooling units include a first cyclic cooling unit and a second cyclic cooling unit. The first cyclic cooling unit is located outside the first air return region, and the second cyclic cooling unit is located outside the second air return region. The air supply duct includes a first air supply duct and a second air supply duct. The first air supply duct communicates with an air inlet vent of the first cyclic cooling unit and the air intake region, and the second air supply duct communicates with an air inlet vent of the second cyclic cooling unit and the air intake region.

In this implementation, the first support and the second support are disposed opposite to each other, to form a structure in which the battery modules on the first support and the battery modules on the second support share one air intake region. In addition, the first cyclic cooling unit and the second cyclic cooling unit that are disposed opposite to each other may separately cool the battery modules on the first support and the battery modules on the second support and recover and cool gas in the first air return region and the second air return region. This further reduces an overall size of the energy storage apparatus.

In a possible implementation, the first air supply duct includes a first air deflector plate, and the first air deflector plate is located at an exit that is of the first air supply duct and that is near the air intake region, and is configured to prevent, from entering the first air supply duct, cooling gas supplied from the second air supply duct; and/or the second air supply duct includes a second air deflector plate, and the second air deflector plate is located at an exit that is of the second air supply duct and that is near the air intake region, and is configured to prevent, from entering the second air supply duct, cooling gas supplied from the first air supply duct.

In this implementation, the first air deflector plate and the second air deflector plate are configured to prevent the cooling gas from flowing back between the first air supply duct and the second air supply duct, to ensure that the cooling gas can smoothly enter the air intake region for cooling and heat dissipation.

In a possible implementation, the air supply duct further includes an eliminating vane. The eliminating vane is located at a top of the air intake region and between the first air supply duct and the second air supply duct. The eliminating vane is configured to direct cooling gas, so that the cooling gas flowing out of the first air supply duct and the second air supply duct enters the air intake region.

In this implementation, a structure of the eliminating vane can direct two streams of cooling gas supplied in opposite directions, so that the streams of cooling gas have a same moving direction when being converged, and large turbulence is not formed. This ensures smooth flow of the cooling gas in the inner cavity and improves cooling efficiency.

In a possible implementation, a power distribution region is further disposed in the inner cavity of the cabinet. The energy storage apparatus further includes a controller and a cooling unit for a power distribution system. The power distribution region is located on one side of the support and is separated from both the air intake region and the air return region. The controller is accommodated in a control region and is configured to control working of each battery module. The cooling unit for the power distribution system corresponds to a position of the power distribution region and is fastened outside the cabinet. The cooling unit for the power distribution system is configured to perform cyclic cooling for the control region.

In this implementation, a controller structure in the power distribution region is relatively independent, and cyclic cooling is performed separately in the power distribution region, so that a cooling effect of the controller can be ensured.

In a possible implementation, the controller includes a power conversion module.

In a possible implementation, the controller includes a direct current distribution unit, a switch unit, and a power switch unit.

In a possible implementation, an air deflection separator is disposed in the power distribution region. Cooling gas supplied by the cooling unit for the power distribution system successively flows through the direct current distribution unit, the switch unit, and the power switch unit, and finally flows back to the cooling unit for the power distribution system.

In a possible implementation, a fire controller is further disposed in the power distribution region.

In a possible implementation, the cabinet further includes an air inlet ventilation casement, an air outlet ventilation casement, and an air supply unit. The air inlet ventilation casement and the air outlet ventilation casement are located at two opposite ends of the cabinet and each communicate with the air intake region. The air supply unit is located at the air inlet ventilation casement and/or the air outlet ventilation casement and is configured to implement ventilation in the air intake region.

In this implementation, the air inlet ventilation casement and the air outlet ventilation casement may perform ventilation for the air intake region when necessary, to facilitate reliable working of the energy storage apparatus.

In a possible implementation, the air inlet ventilation casement and the air outlet ventilation casement each have an open state and a closed state. When the air supply unit works, both the air inlet ventilation casement and the air outlet ventilation casement are in the open state. When the air supply unit does not work, both the air inlet ventilation casement and the air outlet ventilation casement are in the closed state.

In this implementation, statuses of the air inlet ventilation casement and the air outlet ventilation casement are controlled. In this way, the energy storage apparatus can maintain the air intake region sealed in a working process, and a temperature of the cooling gas in the air intake region is ensured.

In a possible implementation, the air inlet ventilation casement and/or the air outlet ventilation casement are/is implemented in a form of a gravity louver.

6

Figure 7:
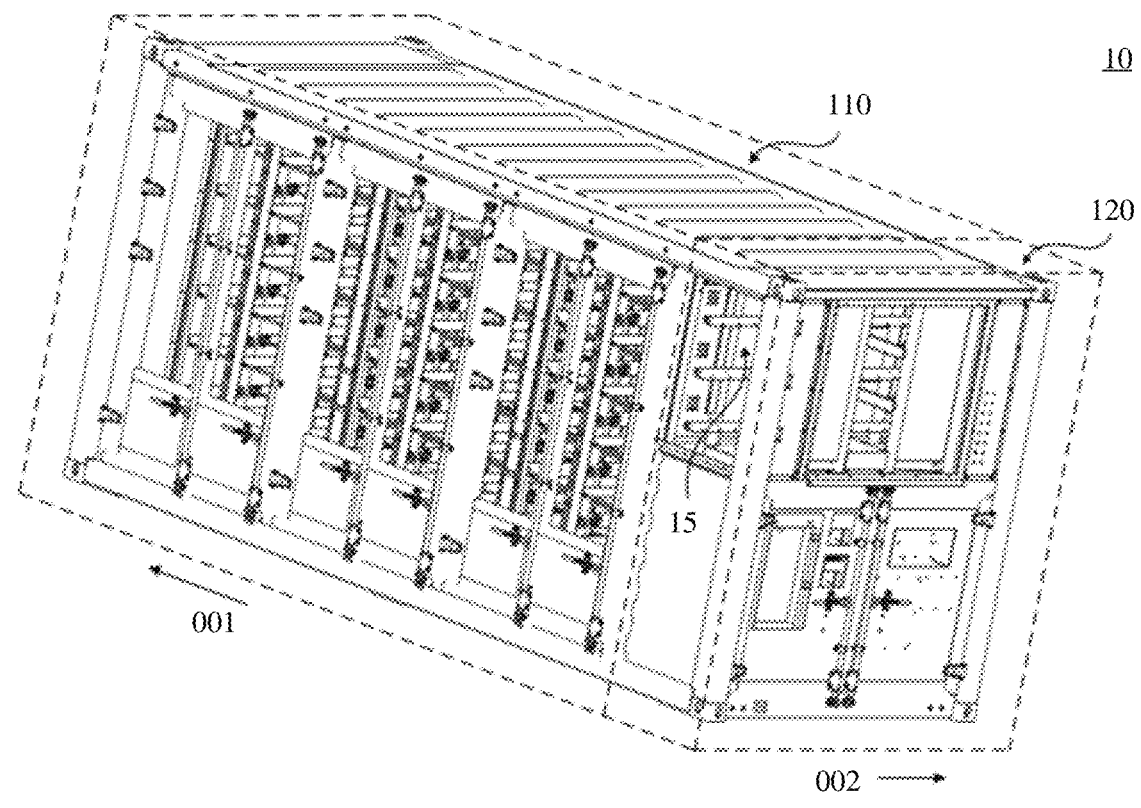
Figure 8:
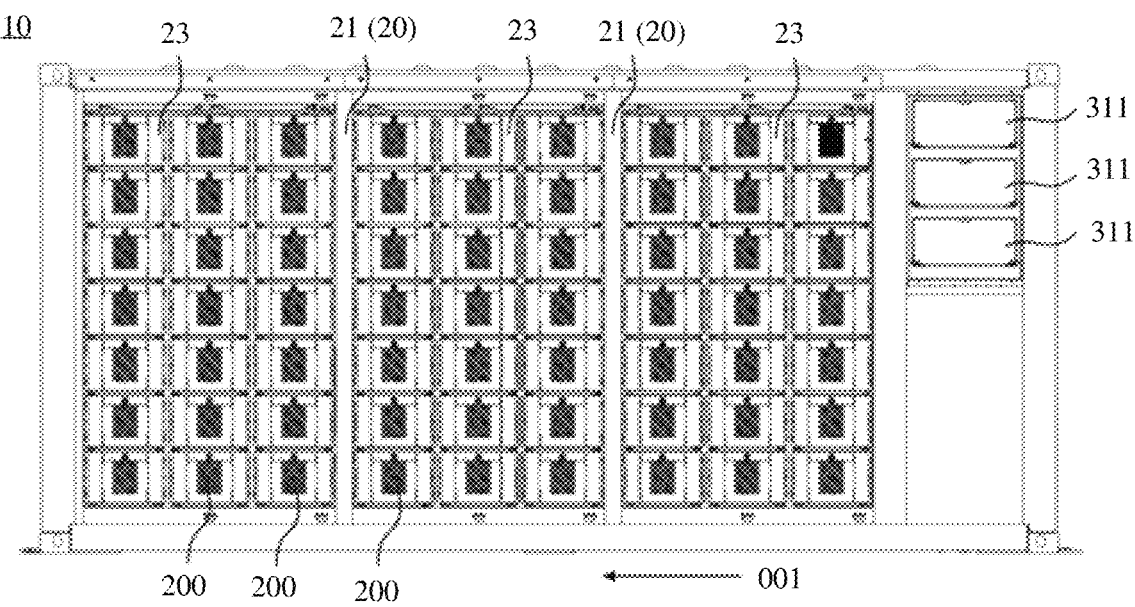
Figure 9:
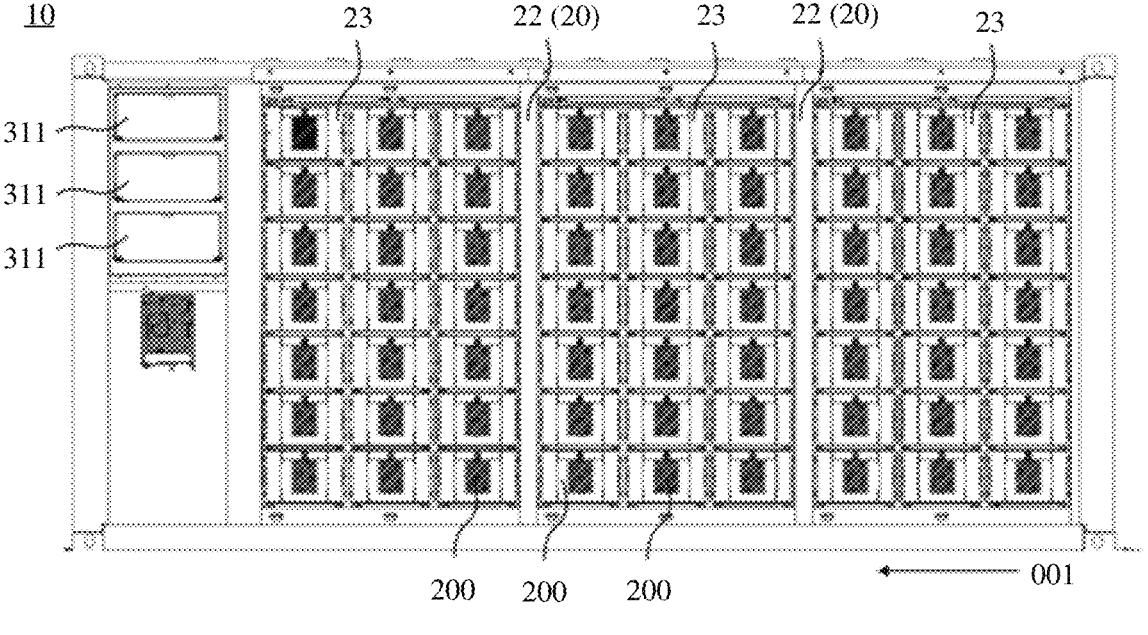
Figure 10:
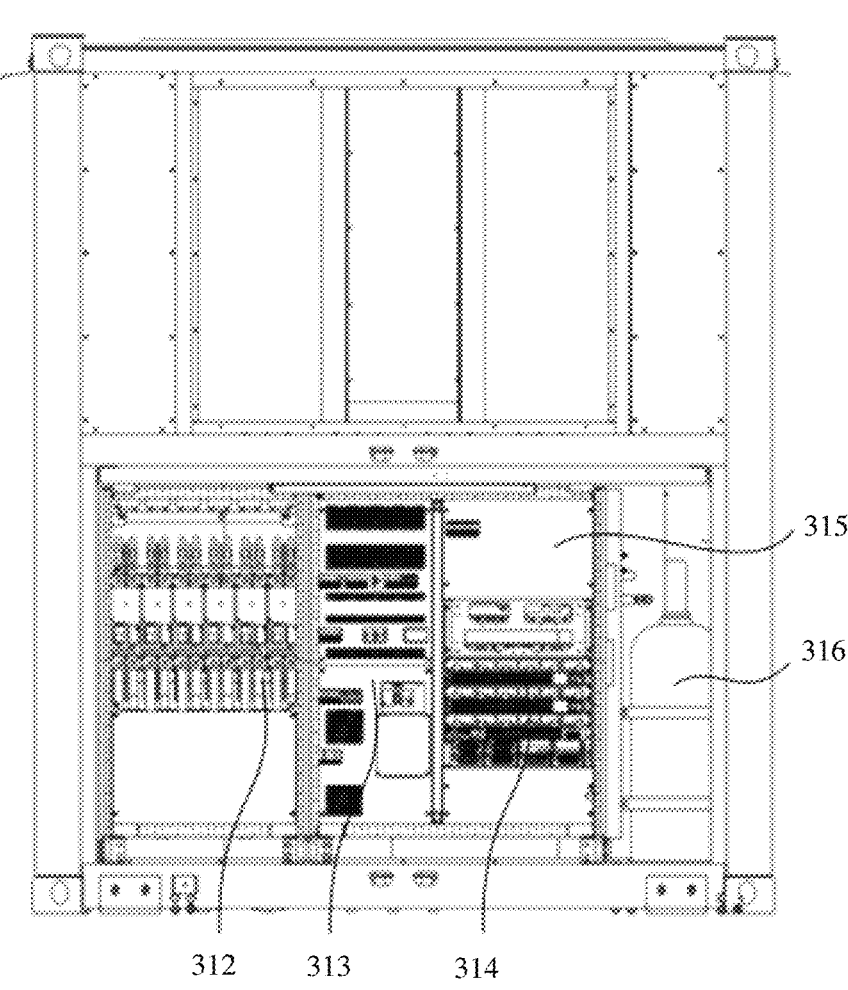
Figure 11:
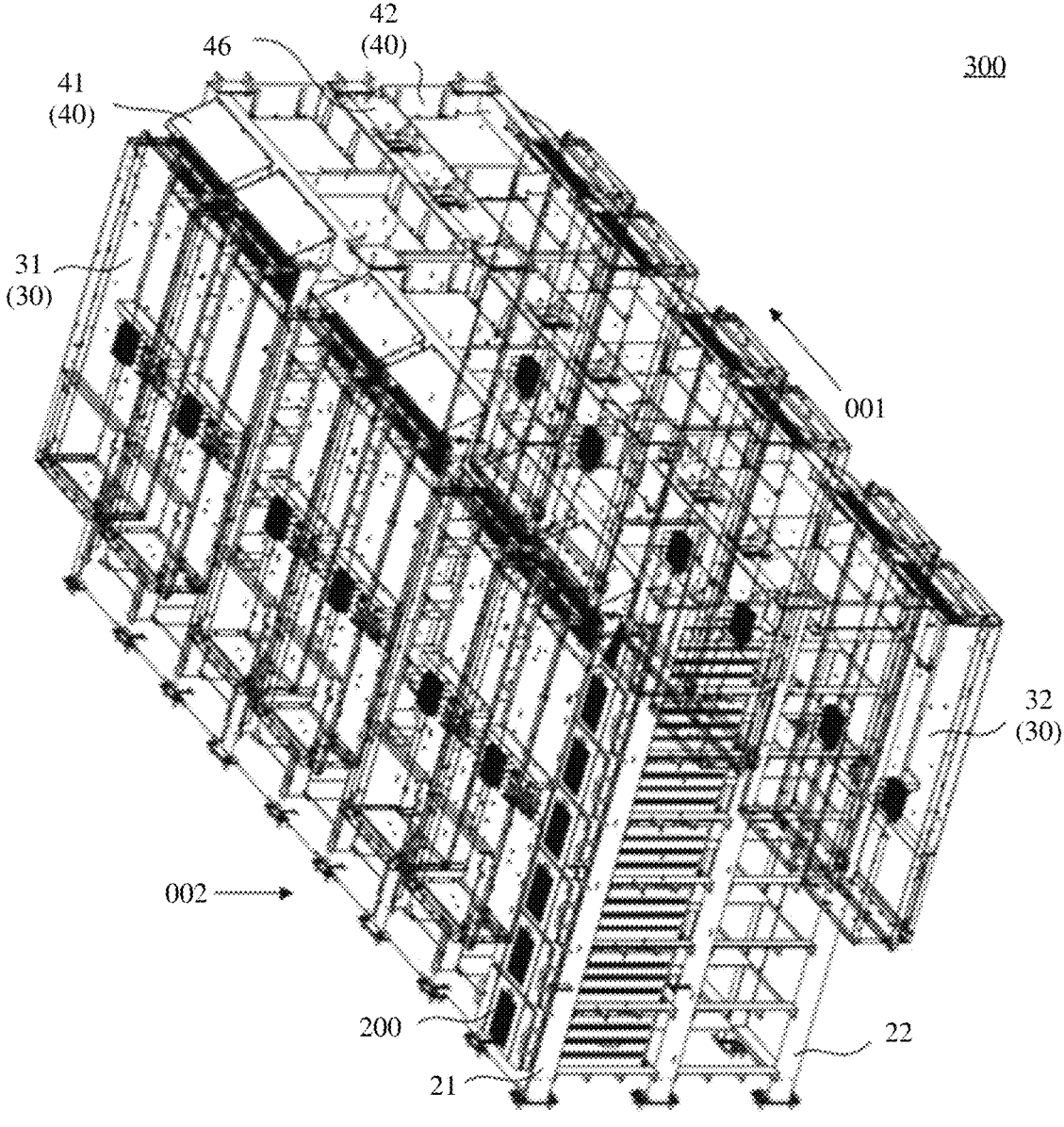
Figure 12:
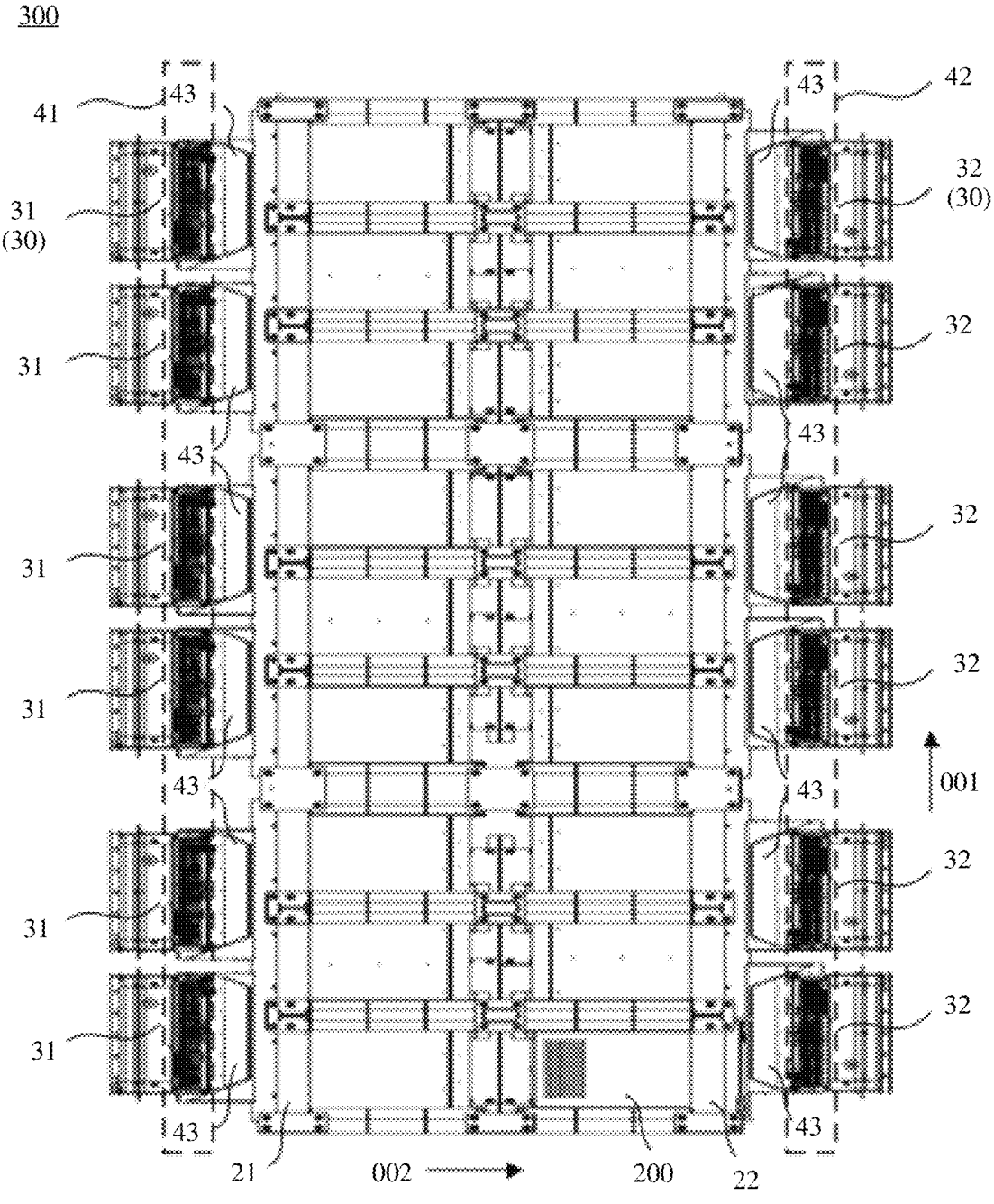
Figure 13:
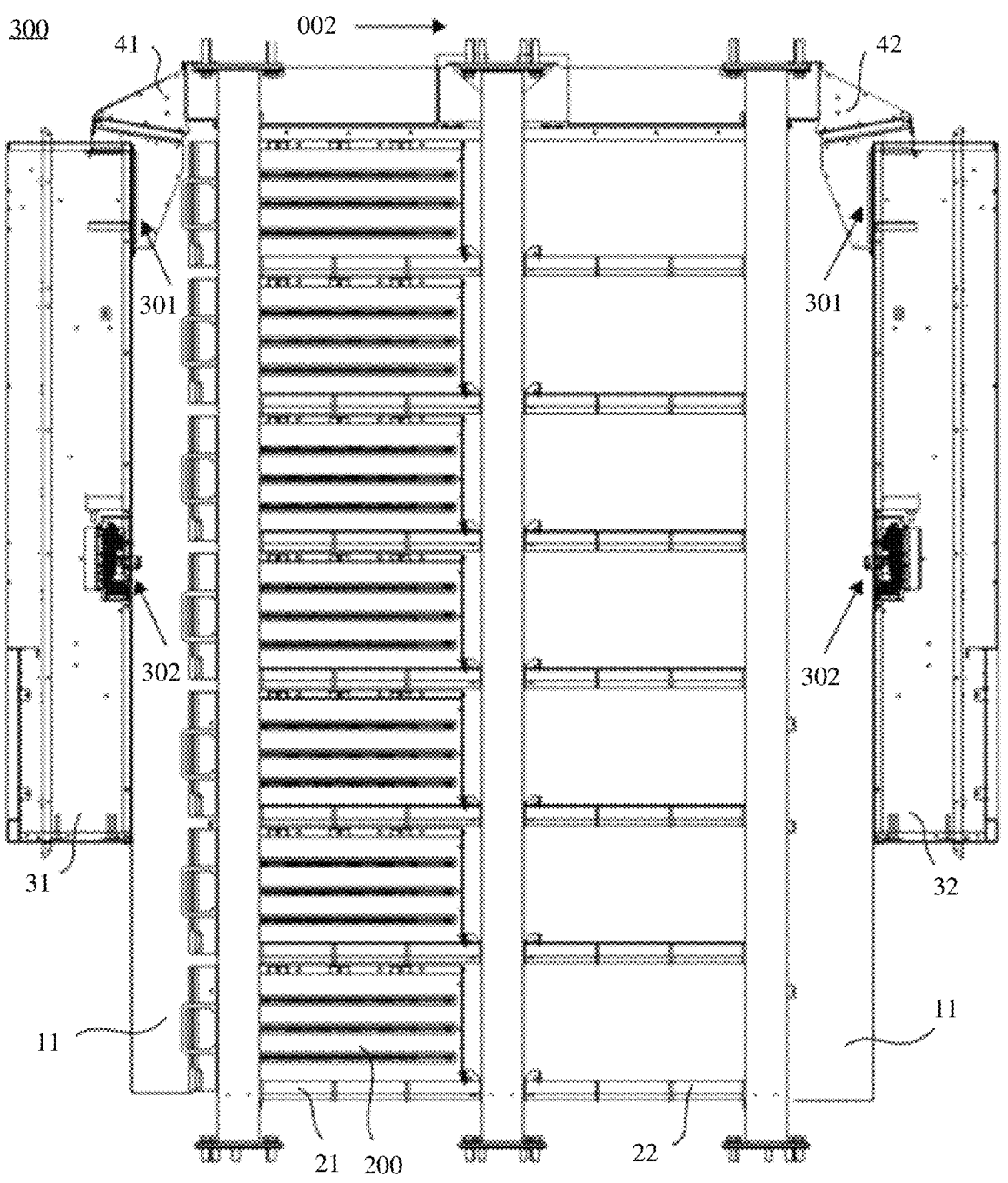
Figure 14:
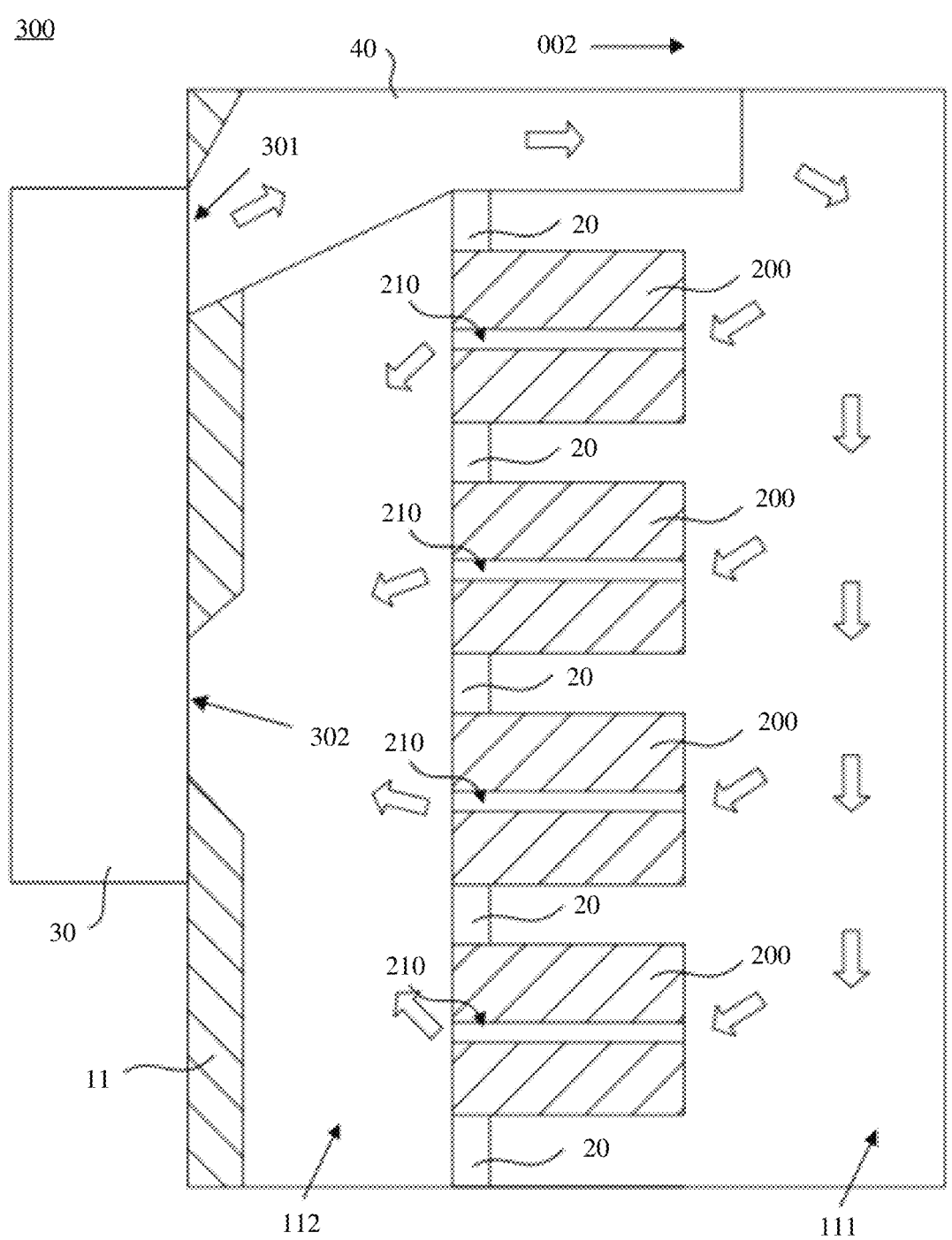
Figure 15:
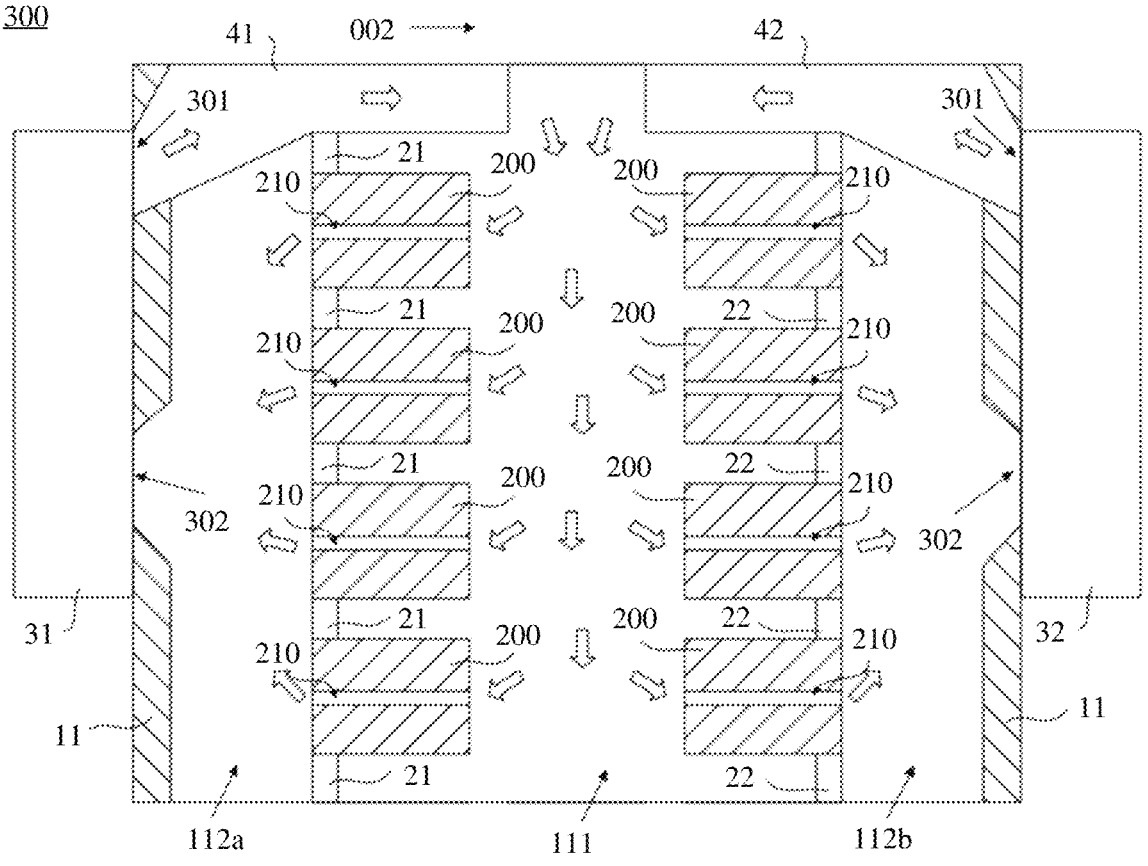
Figure 16:
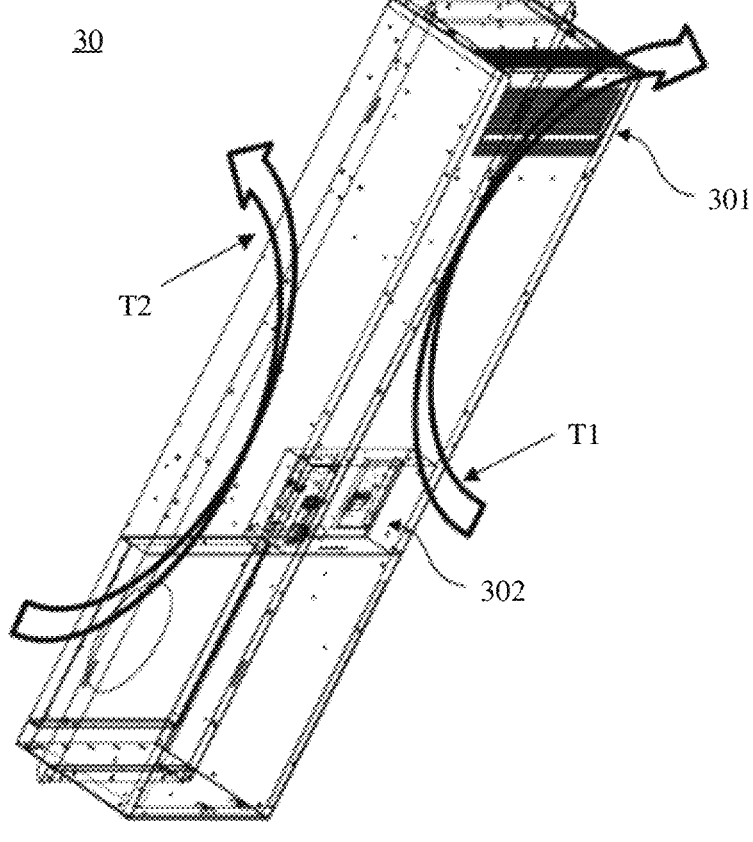
Figure 17:
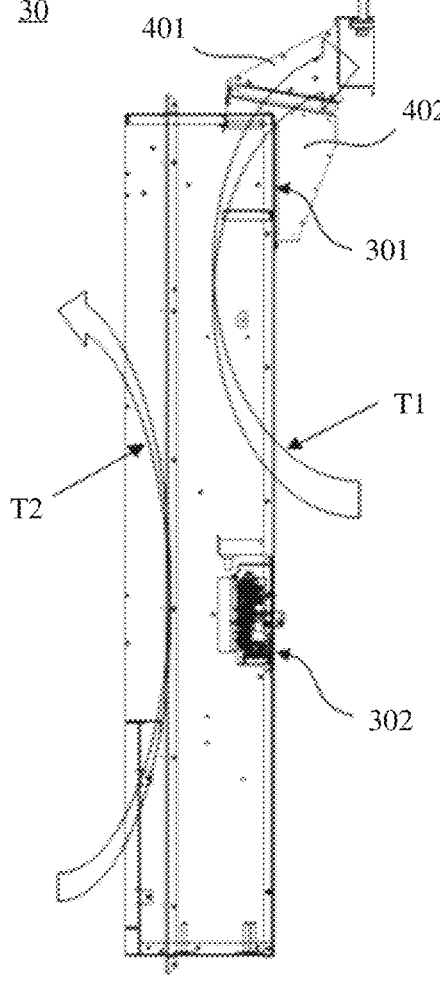
Figure 18:
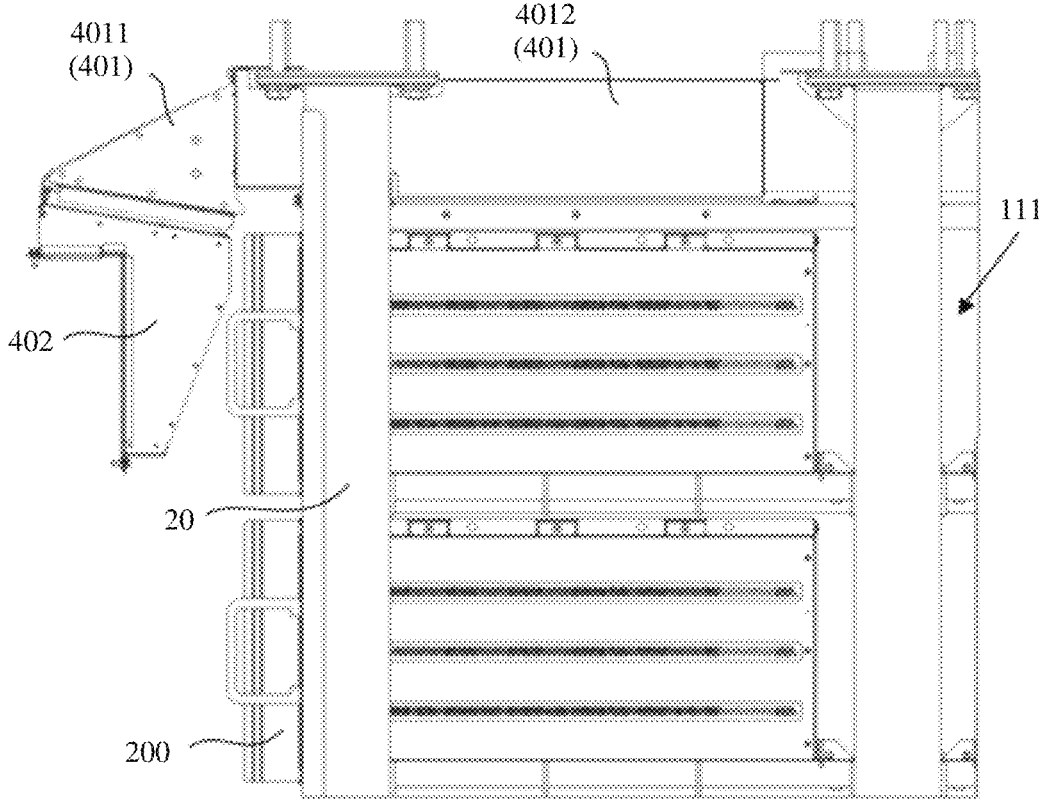
Figure 19:
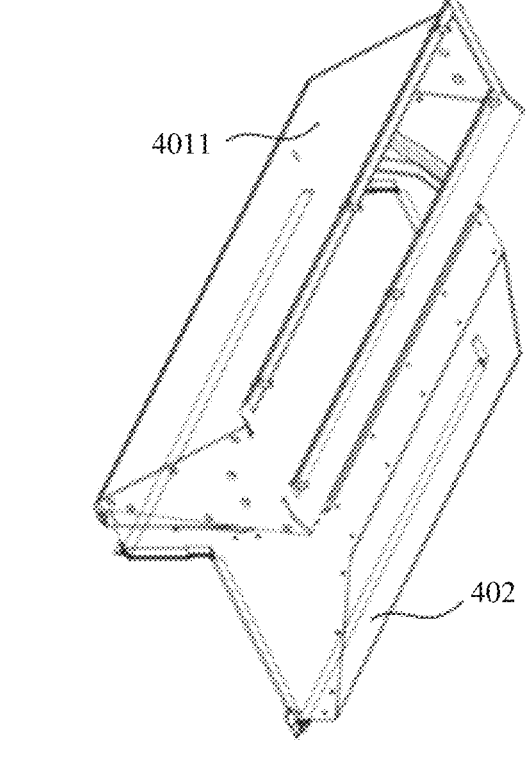
Figure 20:
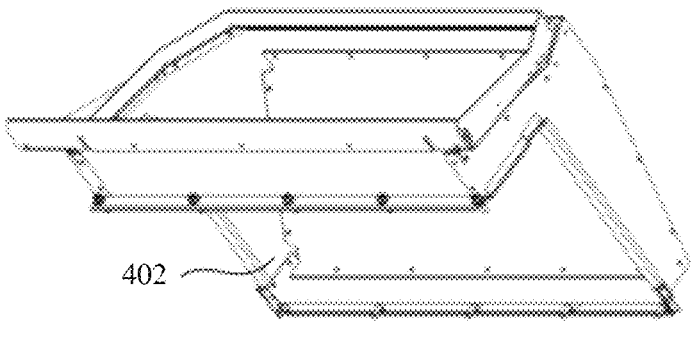
Figure 21:
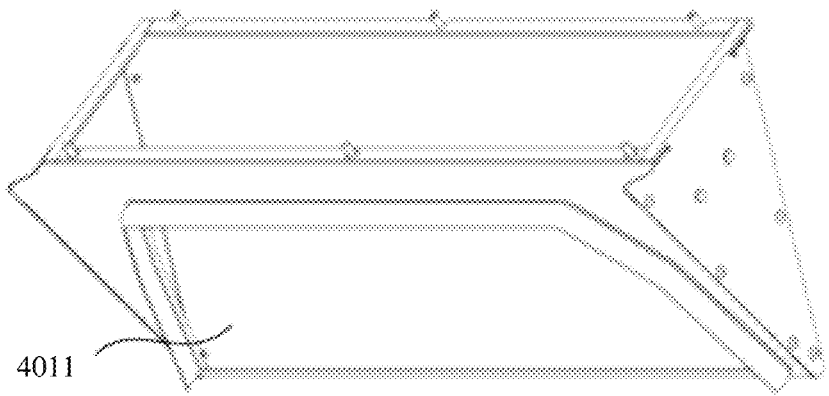
Figure 22:
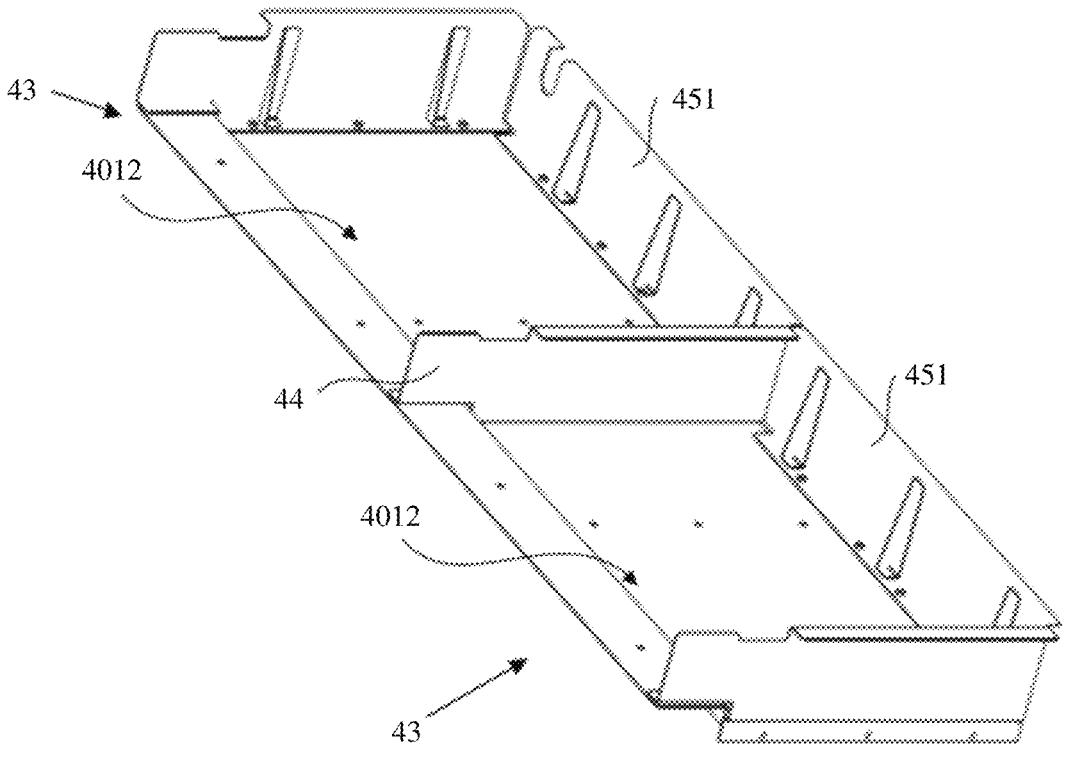
Figure 23:
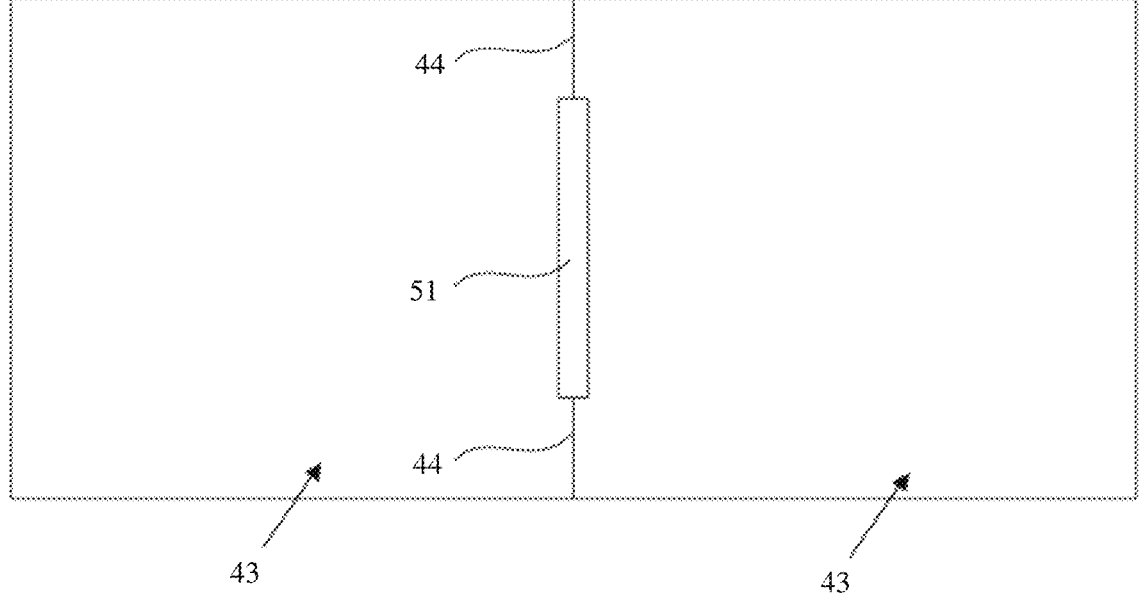
Figure 24:
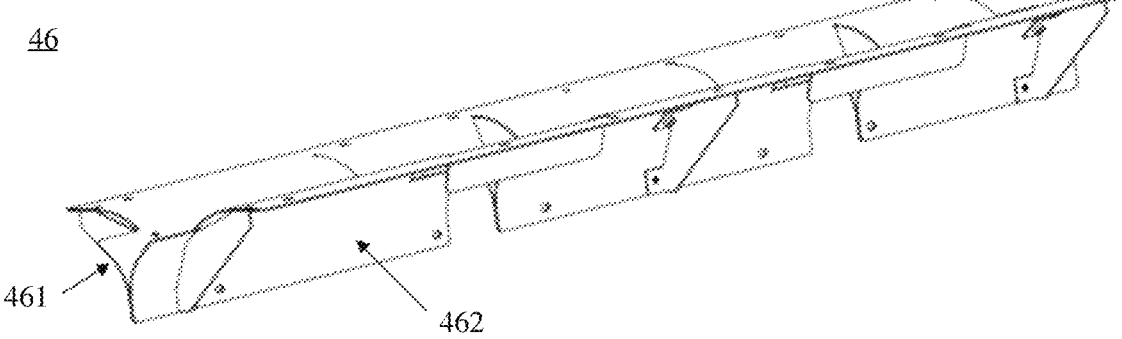
Figure 25:
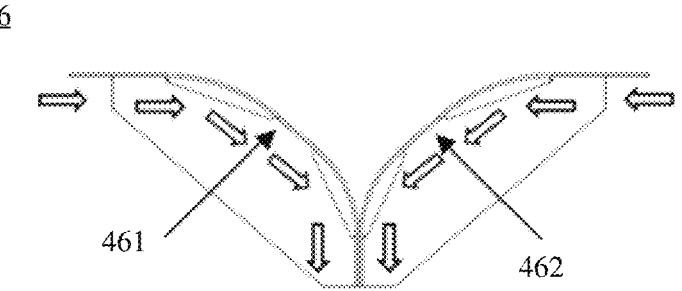
Figure 26:
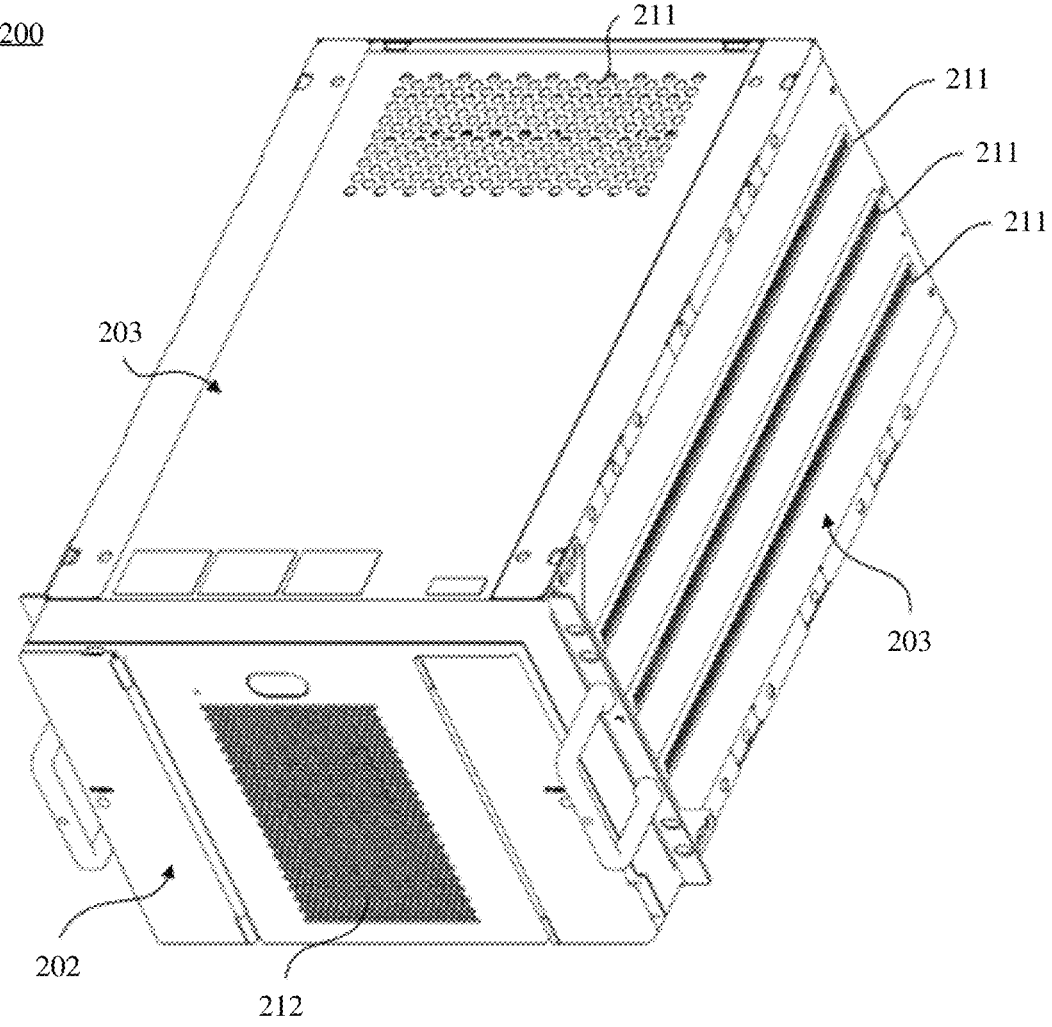
Figure 27:
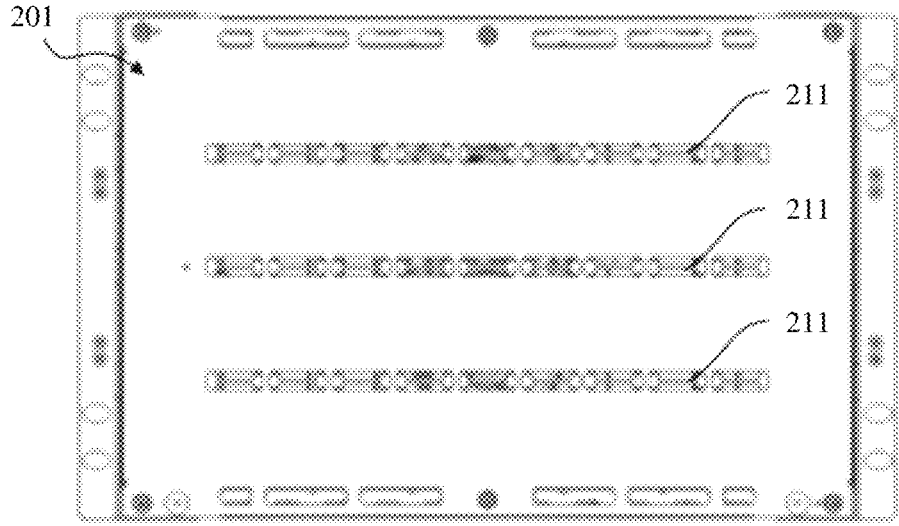
Figure 28A:
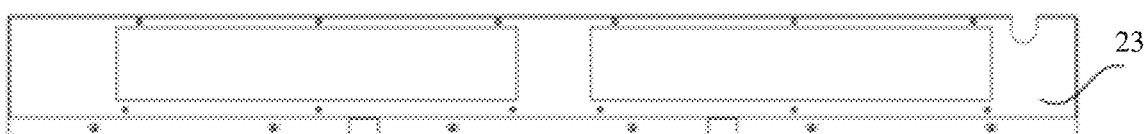
Figure 28B:
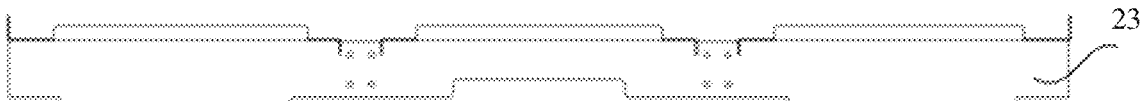
Figure 28C:
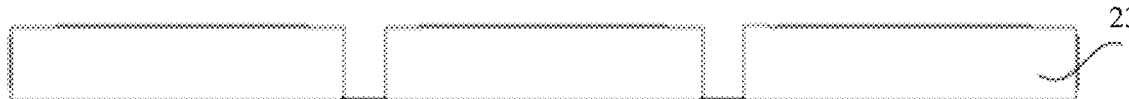
Figure 29:
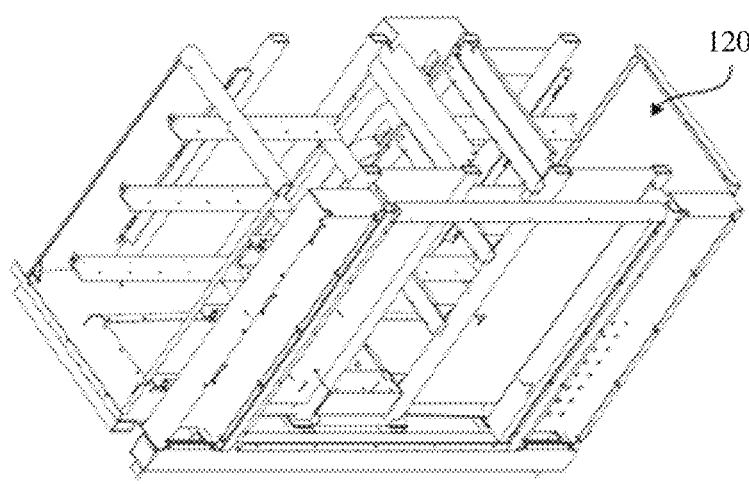
Figure 30:
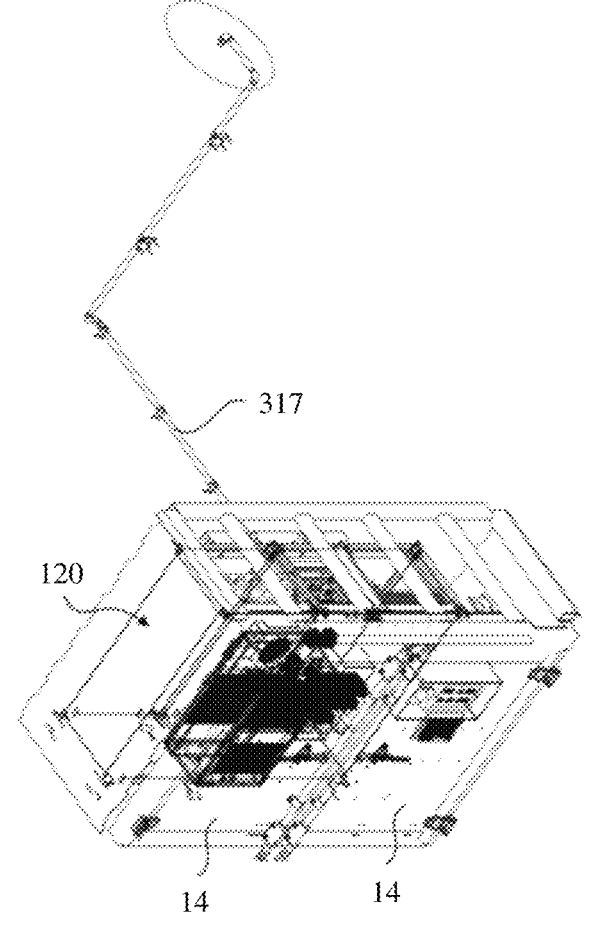
Figure 31:
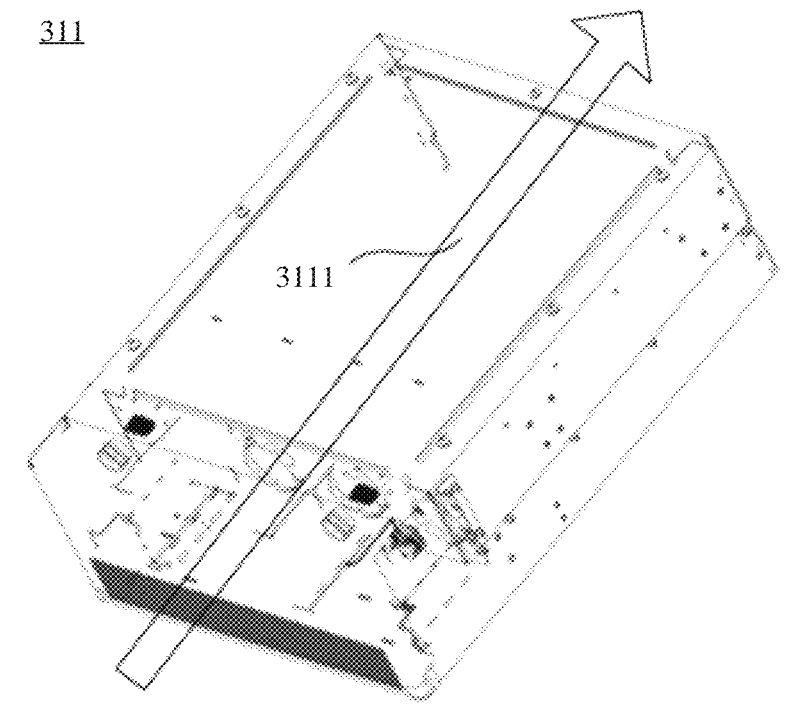
Figure 32:
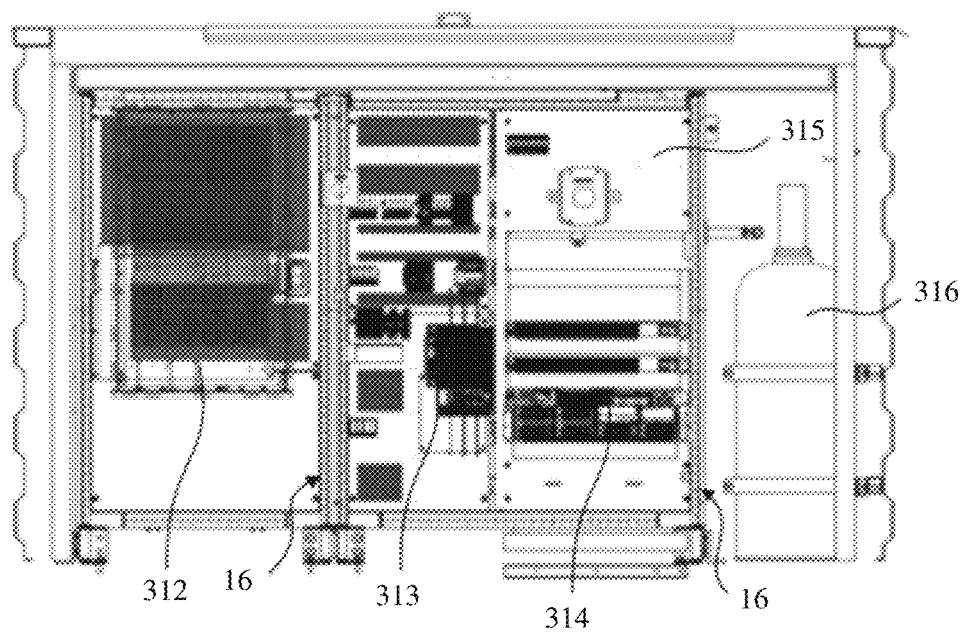
Figure 33:
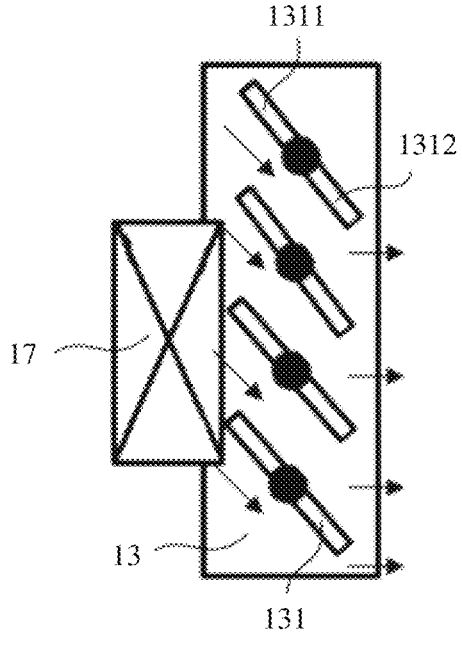
Figure 34:
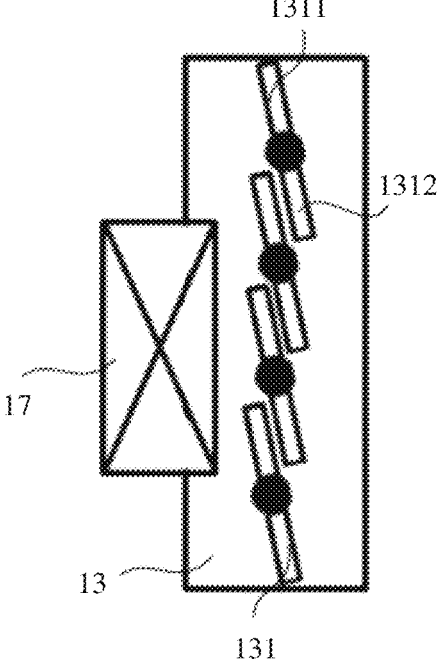

FIG. 7 is a schematic diagram of an internal structure of an energy storage apparatus in which four side walls are not shown;

FIG. 8 is a schematic diagram of an internal structure of an energy storage apparatus in which a first side wall is not shown;

FIG. 9 is a schematic diagram of an internal structure of an energy storage apparatus in which a second side wall is not shown;

FIG. 10 is a schematic diagram of an internal structure of an energy storage apparatus in which a fourth side wall is not shown;

FIG. 11 is a schematic diagram of an external overall structure of an energy storage apparatus;

FIG. 12 is a schematic top view of an external overall structure of an energy storage apparatus;

FIG. 13 is a schematic rear view of an external overall structure of an energy storage apparatus;

FIG. 14 is a schematic diagram of an internal structure of an energy storage apparatus according to an embodiment;

FIG. 15 is a schematic diagram of an internal structure of an energy storage apparatus according to another embodiment;

FIG. 16 is a schematic diagram of a structure of a cyclic cooling unit in an energy storage apparatus;

FIG. 17 is a schematic diagram of structures of a cyclic cooling unit and an air supply duct in an energy storage apparatus;

FIG. 18 is a schematic diagram of a structure of an air supply duct in an energy storage apparatus;

FIG. 19 is a schematic diagram of a partial structure of an air supply duct in an energy storage apparatus;

FIG. 20 is a schematic diagram of a structure of a docking hatch of an air supply duct in an energy storage apparatus;

FIG. 21 is a schematic diagram of a structure of a movable section of an air supply duct in an energy storage apparatus;

FIG. 22 is a schematic diagram of a structure of an air deflection end of an air supply duct in an energy storage apparatus;

FIG. 23 is a schematic diagram of a partial structure of an air supply duct in an energy storage apparatus according to another embodiment;

FIG. 24 is a schematic diagram of a structure of an eliminating vane in an energy storage apparatus;

FIG. 25 is a schematic rear view of a structure of an eliminating vane in an energy storage apparatus;

FIG. 26 is a schematic diagram of a structure of a battery module in an energy storage apparatus;

FIG. 27 is a schematic plane diagram of an air inlet surface of a battery module in an energy storage apparatus;

FIG. 28a is a schematic diagram of a structure of baffle plates in an energy storage apparatus;

FIG. 28b is a schematic diagram of a structure of baffle plates in an energy storage apparatus;

FIG. 28c is a schematic diagram of a structure of baffle plates in an energy storage apparatus;

FIG. 29 is a schematic diagram of an upper component structure of a second region in an energy storage apparatus;

FIG. 30 is a schematic diagram of a lower component structure of a second region in an energy storage apparatus;

FIG. 31 is a schematic diagram of a structure of a power conversion module of a controller in an energy storage apparatus;

FIG. 32 is a schematic plane diagram of a lower component in a second region in an energy storage apparatus;

FIG. 33 is a schematic diagram of a structure of an air outlet ventilation casement in an open state in an energy storage apparatus; and FIG. 34 is a schematic diagram of a structure of an air outlet ventilation casement in a closed state in an energy storage apparatus.

DETAILED DESCRIPTION OF THE EMBODIMENTS

The following describes the embodiments with reference to the accompanying drawings. It is clear that the described embodiments are merely some but not all of the embodiments. All other embodiments obtained by a person of ordinary skill in the art without creative efforts shall fall within the scope of the embodiments.

Figure 1:
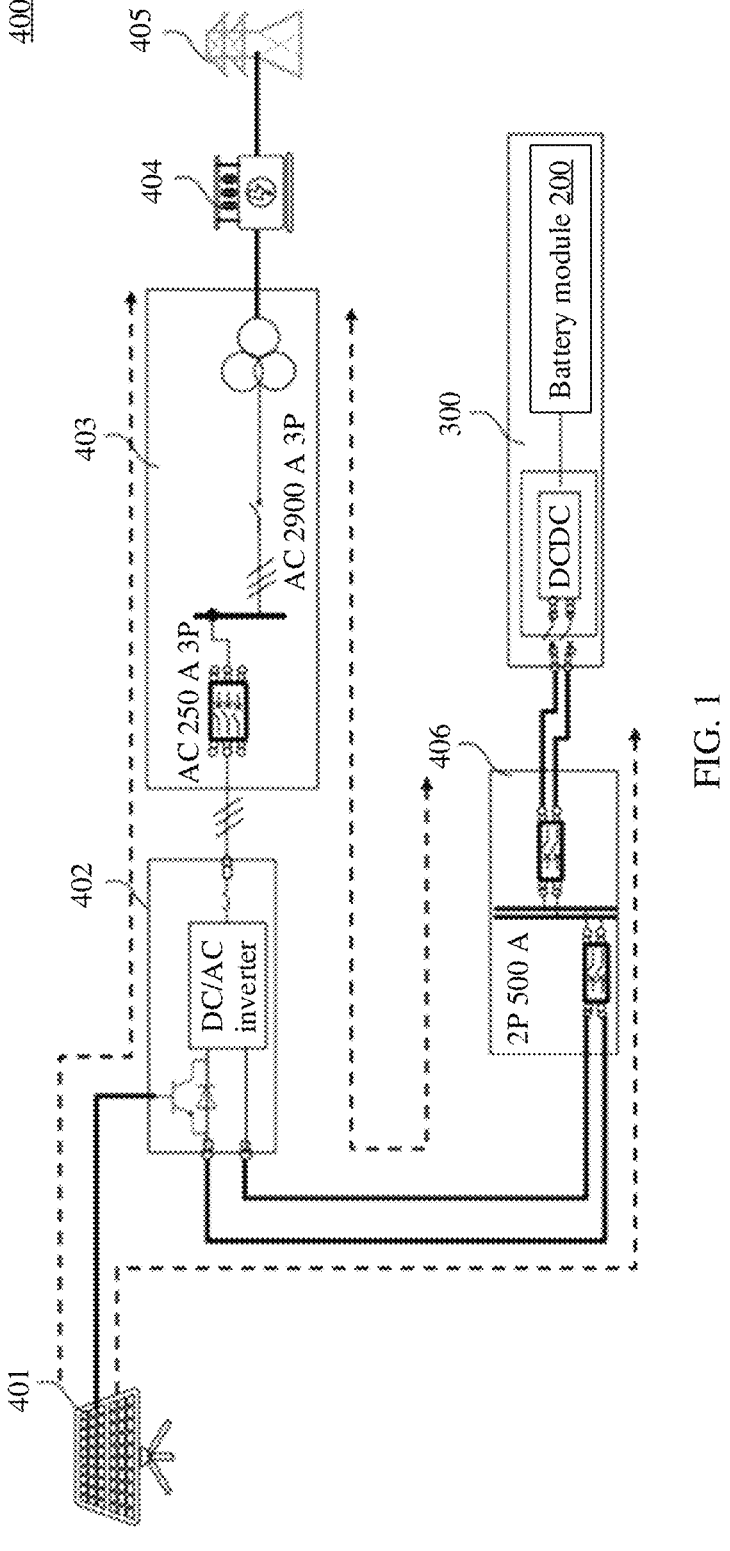
FIG. 1 is a schematic diagram of an application scenario of an energy storage apparatus.

FIG. 1 is a schematic diagram of an application scenario of an energy storage apparatus 300.

In FIG. 1, the energy storage apparatus 300 may be applied to a photovoltaic power grid system 400. The photovoltaic power grid system 400 further includes a photovoltaic system 401, an inverter 402, a Static Transfer Switch (STS) 403, a transformer 404, a power grid 405, and a Power Conversion System (PCS) 406. The photovoltaic system 401 is electrically connected to the inverter 402, and an output end of the inverter 402 is connected to two transmission lines. On one of the transmission lines, the inverter 402 is connected to the power grid 405 successively through the transfer switch 403 and the transformer 404. On the other transmission line, the inverter 402 is connected to the energy storage apparatus 300 through the power conversion system 406.

The photovoltaic system 401 is configured to: convert received solar energy into electric energy and transmit the electric energy to the electrically connected inverter 402. The inverter 402 is configured to: convert a direct current obtained through conversion by the photovoltaic system 401 into an alternating current, and output electric energy with a stable voltage to both the transfer switch 403 and the power conversion system 406. On the transmission line on which the transfer switch 403 is located, the transfer switch 403 is configured to control switching of an internal line in the photovoltaic power grid system 400. The transfer switch 403 may be configured to control the transformer 404 and the power grid 405 to be connected to the photovoltaic system 401 or the energy storage apparatus 300. The transformer 404 is configured to boost a voltage of electric energy transmitted to the power grid 405, so as to reduce a loss of the electric energy in a transmission process. The power grid 405 delivers the electric energy to a power consumption side.

Figure 2:
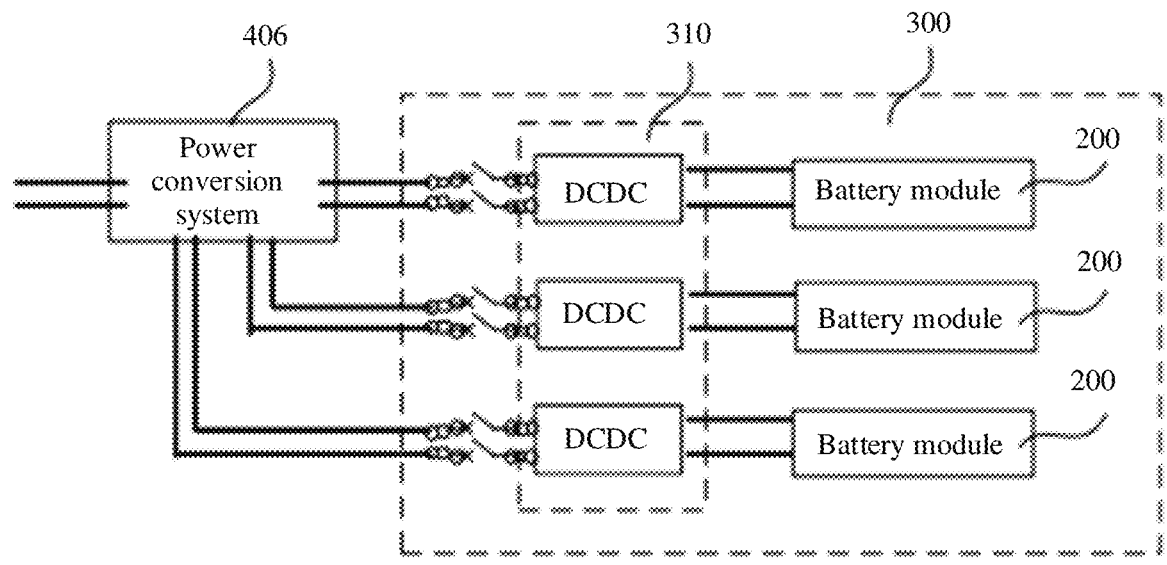
FIG. 2 is a schematic diagram of an internal structural framework of an energy storage apparatus.

On the transmission line on which the energy storage apparatus 300 is located, the power conversion system 406 is configured to convert an alternating current output by the inverter 402 into a direct current, to control charging and discharging functions of the energy storage apparatus 300. See a schematic diagram of an internal structural framework of the energy storage apparatus 300 shown in FIG. 2. After the power conversion system 406 provides direct current power distribution, a controller 310 in the energy storage apparatus 300 performs voltage conversion, and controls charging and discharging of a battery module 200 in the energy storage apparatus 300 one by one. In the figure, a quantity of controllers 310 is the same as that of battery modules 200, and the controllers control charging and discharging of the battery modules 200 in a one-to-one correspondence manner. In other embodiments, the controller 310 may alternatively be electrically connected to a plurality of battery modules 200, to simultaneously control charging and discharging functions of the plurality of battery modules 200.

In the application scenario of the energy storage apparatus 300, the photovoltaic system 401 may generate power by using solar energy, and output power of the photovoltaic system 401 may be directly related to sunlight illumination intensity. the photovoltaic system 401 may implement a power generation function when the daylight is sufficient. In this case, the photovoltaic system 401 can provide electric energy for not only the power grid 405 but also the energy storage apparatus 300 under control of the transfer switch 403. In this case, the energy storage apparatus 300 may be charged in daytime. When there is no sunlight at night, the energy storage apparatus 300 may be connected to the power grid 405 under control of the transfer switch 403, to provide stored electric energy to the power grid 405 for electric energy consumption. Further, when a power load at the power grid 405 is small, the power grid 405 may perform reverse charging on the energy storage apparatus 300. In this way, the energy storage apparatus 300 may perform a peak adjustment function on the power grid 405.

The photovoltaic power grid system 400 shown in FIG. 1 has a characteristic of large intermittent fluctuation of power generation in a working process because sunlight illumination intensity varies greatly with time. When the energy storage apparatus 300 is applied to the photovoltaic power grid system 400, peak adjustment may be performed on both the photovoltaic system 401 and the power grid 405, to maintain a continuous power supply capability of the photovoltaic power grid system 400. In addition, electric energy is consumed when the photovoltaic system 401 generates a large amount of electric energy or the power grid 405 has a small power consumption load. It may be understood that the energy storage apparatus 300 is not limited to the photovoltaic power grid system 400, but the energy storage apparatus 300 may be further applied to a power generation system having a similar requirement, for example, a wind power generation system or another power generation system that also has the characteristic of large intermittent fluctuation of power generation. In these power generation systems, a function of the energy storage apparatus 300 may be similar to a function in the photovoltaic power grid system 400. Details are not described herein.

Figure 3:
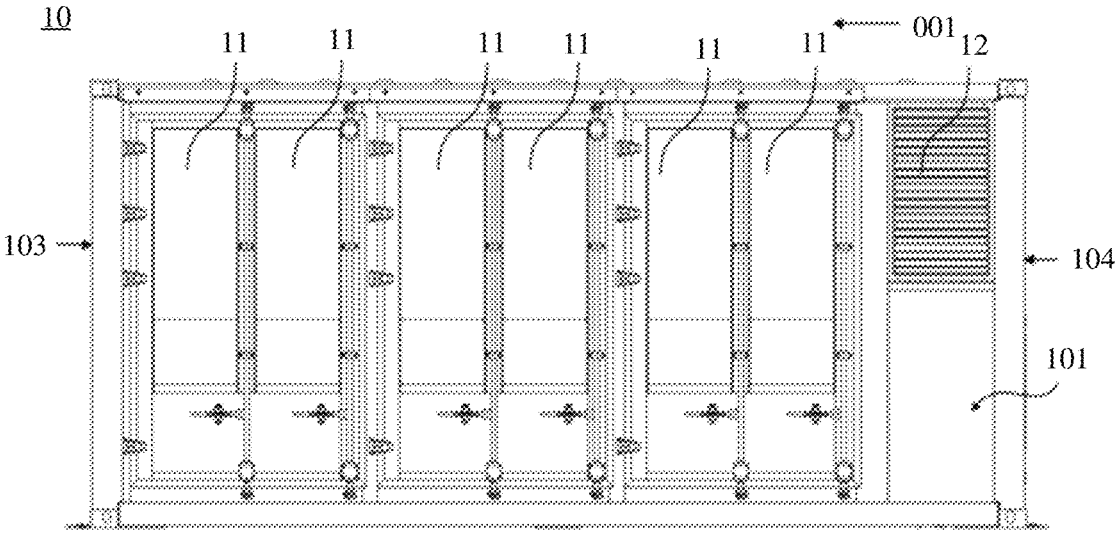
FIG. 3 is a schematic diagram of a structure of a first side wall of a cabinet in an energy storage apparatus.
Figure 4:
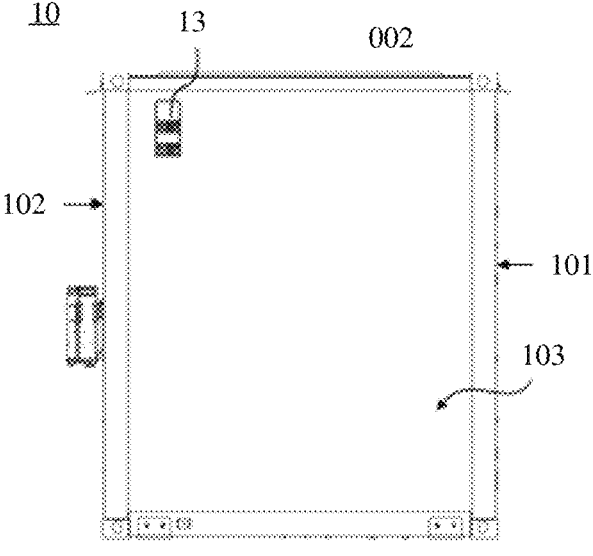
FIG. 4 is a schematic diagram of a structure of a third side wall of a cabinet in an energy storage apparatus.
Figure 5:
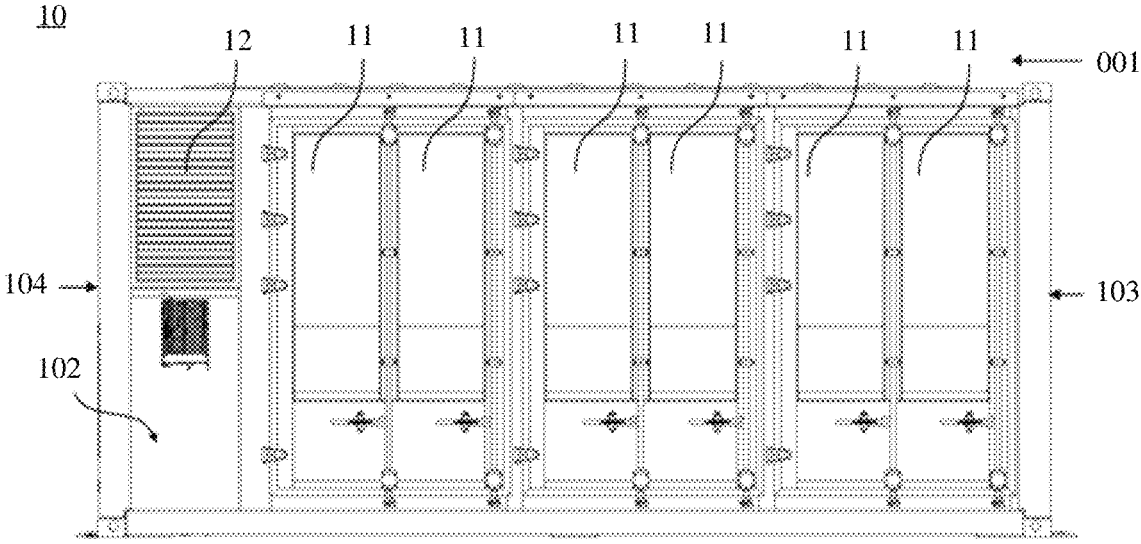
FIG. 5 is a schematic diagram of a structure of a second side wall of a cabinet in an energy storage apparatus.
Figure 6:
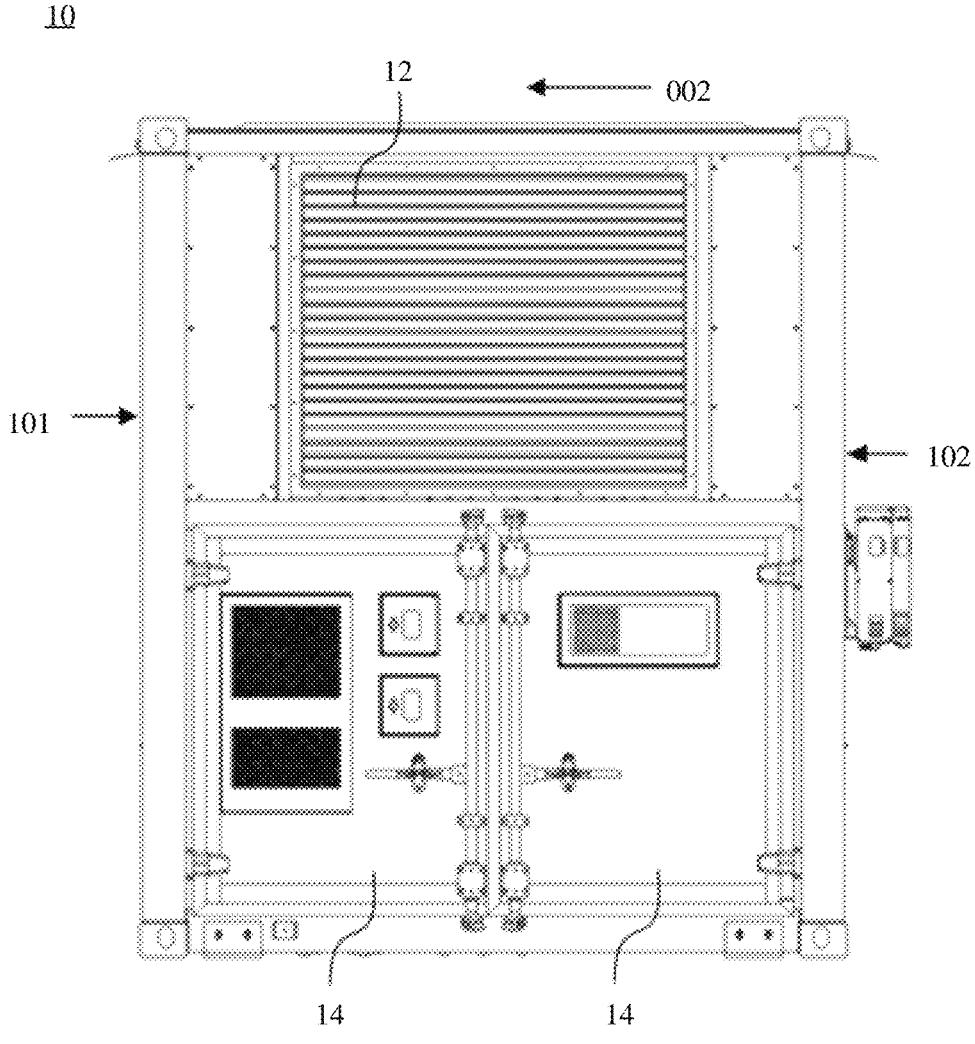
FIG. 6 is a schematic diagram of a structure of a fourth side wall of a cabinet in an energy storage apparatus.

FIG. 3 to FIG. 6 show an external structure of a cabinet 10 in the energy storage apparatus 300. The cabinet 10 of the energy storage apparatus 300 may be substantially rectangular and have four side walls. FIG. 3 and FIG. 5 respectively show structures of two opposite side walls, that is, a first side wall 101 and a second side wall 102 of the cabinet 10. FIG. 4 and FIG. 6 respectively show structures of the other pair of opposite side walls, that is, a third side wall 103 and a fourth side wall 104 of the cabinet 10.

As shown in FIG. 3 to FIG. 6, the first side wall 101 and the second side wall 102 may have larger exterior widths than the third side wall 103 and the fourth side wall 104. Therefore, in this embodiment, the first side wall 101 and the second side wall 102 are defined as side walls extending in a length direction (a first direction 001) of the cabinet 10, and the third side wall 103 and the fourth side wall 104 are defined as side walls extending in a width direction (a second direction 002) of the cabinet 10. The cabinet 10 further includes a top wall (not shown in the figure) and a bottom wall (not shown in the figure). The top wall, the bottom wall, and the four side walls are fastened to each other and around the cabinet 10, to form an inner cavity of the cabinet 10. It may be understood that the inner cavity may be a sealed inner cavity. Some components of the energy storage apparatus 300 are accommodated in the inner cavity and are sealed and protected by the cabinet 10. In some embodiments, to facilitate transportation and installation of the energy storage apparatus 300, the cabinet 10 may be implemented by using an appearance and specifications of a container.

As shown in FIG. 3 and FIG. 5, a cabinet door 11 may be disposed on the first side wall 101 and the second side wall 102 of the cabinet 10. There may be a plurality of cabinet doors 11, and the plurality of cabinet doors 11 are successively arranged in the first direction 001. Two vent sashes 12 are respectively disposed at one end of the first side wall 101 near the fourth side wall 104 and at one end of the second side wall 102 near the fourth side wall 104. The vent sash 12 is configured to implement air circulation between the outside and an inner cavity of a region corresponding to the vent sash 12.

FIG. 4 shows a structure of the third side wall 103. An air outlet ventilation casement 13 is disposed on the third side wall 103 of the cabinet 10. As shown in FIG. 6, a vent sash 12 is disposed on the fourth side wall 104 of the cabinet 10. A position of the vent sash 12 is horizontally aligned with positions of the vent sashes 12 on the first side wall 101 and the second side wall 102. A cabinet door 14 communicating with a lower region of the inner cavity is disposed on a lower part of the fourth side wall 104 shown in FIG. 6. It should be noted that the cabinet door 14 is located below the vent sash 12 in FIG. 6. In some other embodiments, the cabinet door 14 may alternatively be located above the vent sash 12, and the positions of the vent sashes 12 on the first side wall 101 and the second side wall 102 also move downward as the vent sash 12 on the fourth side wall 104.

FIG. 7 shows a structure of the inner cavity of the cabinet 10 in which four side walls are not shown.

A separator 15 separates the inner cavity of the cabinet 10 into a first region 110 and a second region 120. The first region 110 and the second region 120 are arranged in the length direction (the first direction 001) of the cabinet 10. The second region 120 is located near the fourth side wall 104. The vent sashes 12 each communicate with the second region 120, and the cabinet door 14 is configured to open lower space of the second region 120. In some embodiments, the second region 120 may be configured to accommodate the controller 310 of the energy storage apparatus 300.

Refer to structures shown in FIG. 8 to FIG. 10. FIG. 8 and FIG. 9 respectively show structures within the first side wall 101 and the second side wall 102, and FIG. 10 shows a structure within the fourth side wall 104. In FIG. 10, the controller 310 accommodated in the second region 120 may include a power conversion module 311 (refer to FIG. 8 and FIG. 9), a direct current distribution unit 312, a switch unit 313, and a power switch unit 314. In some embodiments, a fire controller 315 and a fire extinguisher 316 may be further disposed in the second region 120. The power conversion module 311 is disposed, corresponding to the positions of the three vent sashes 12, in an upper part of the second region 120. The direct current distribution unit 312, the switch unit 313, the power switch unit 314, and the fire controller 315 are disposed, corresponding to a position of the cabinet door 14, below the power conversion module 311.

Air circulation and heat dissipation may be implemented for the power conversion module 311 through the vent sash 12. Other components are in a region corresponding to the cabinet door 14, and heat dissipation may be implemented through air cooling. Components in the second region 120 work together to control charging and discharging actions of the battery module 200 in the energy storage apparatus 300. It may be understood that the second region 120 may correspond to the power distribution region.

With reference to FIG. 8 and FIG. 9, a support 20 and a plurality of battery modules 200 are disposed in the first region 110 of the cabinet 10. The support 20 is fastened in the inner cavity of the cabinet 10, and the plurality of battery modules 200 each are fastened to the support 20. In an embodiment in this figure, the support 20 includes a first support 21 and a second support 22. The first support 21 and the second support 22 are disposed at intervals in the second direction 002, and each are configured to carry a part of the battery modules 200. The battery modules 200 are arranged in an array manner and fastened on both the first support 21 and the second support 22, to improve an arrangement density of the battery modules 200 and improve a cabinet deployment rate of the energy storage apparatus 300.

As shown in FIG. 11 to FIG. 13, the energy storage apparatus 300 may further include cyclic cooling units 30 and an air supply duct 40. The cyclic cooling units 30 are fastened outside the cabinet 10 and are fastened at positions of the first side wall 101 and the second side wall 102 in the schematic diagram. The cabinet doors 11 are further disposed on outer surfaces of the first side wall 101 and the second side wall 102. Therefore, in this embodiment, the cyclic cooling unit 30 may be further fastened on the cabinet door 11 and may rotate with the cabinet door 11 relative to the cabinet 10. When the energy storage apparatuses 300 are arranged in a centralized manner, space for opening and closing the cabinet door 11 may need to be reserved at a position corresponding to the cabinet door 11. The cyclic cooling unit 30 is fastened on the cabinet door 11. This can properly use the reserved space outside the cabinet door 11 and save internal space of the cabinet 10. In some other embodiments, the cyclic cooling units 30 may alternatively be fastened at positions other than the cabinet doors 11 on the first side wall 101 and the second side wall 102 and are fastened relative to the cabinet 10.

The cyclic cooling unit 30 includes an air inlet vent 301 and an air return vent 302 (refer to FIG. 13). Both the air inlet vent 301 and the air return vent 302 communicate with the inner cavity of the cabinet 10. Both the air inlet vent 301 and the air return vent 302 may communicate with the first region 110 of the inner cavity. The air inlet vent 301 of the cyclic cooling unit 30 is configured to supply cooling gas with a low temperature to the first region 110. The air return vent 302 is configured to direct, to the cyclic cooling unit 30 for cooling again, gas that has a high temperature after heat dissipation in the first region 110, and returns the gas from the air inlet vent 301 to the first region 110, to achieve a cyclic cooling effect.

The air supply duct 40 is located between the cyclic cooling unit 30 and the cabinet 10. The air supply duct 40 may communicate with the air inlet vent 301 and the first region 110. Cooling gas supplied by the cyclic cooling unit 30 from the air inlet vent 301 may flow through the air supply duct 40 into the first region 110. FIG. 14 shows an internal structure when there is one support 20. In the first region 110 of the inner cavity, the support 20 and each battery module 200 carried by the support 20 may separate the inner cavity into two relatively independent regions: an air intake region 111 and an air return region 112. The air supply duct 40 communicates with the air inlet vent 301 and the air intake region 111, and the air return vent 302 communicates with the air return region 112 through the cabinet door 11. Further, a heat dissipation duct 210 is disposed in the battery module 200. The heat dissipation duct 210 passes through the inside of the battery module 200 and communicates with the air intake region 111 and the air return region 112.

Therefore, cooling gas with a low temperature supplied from the air inlet vent 301 to the air intake region 111 may pass through the heat dissipation duct 210 inside the battery module 200 and enter the air return region 112. Then, the gas flows back to the cyclic cooling unit 30 from the air return vent 302 communicating with the air return region 112. The heat dissipation duct 210 is disposed inside the battery module 200. This ensures that the cooling gas supplied by the cyclic cooling unit 30 can flow through the inside of the battery module 200, sufficient cooling is performed on the battery module 200, and then the cooling gas flows back to the cyclic cooling unit 30 for cooling again.

It may be understood that, when a sealed connection is formed between the support 20 and the battery modules 200 carried by the support 20, that is, when the support 20 and the battery modules 200 can separate the first region 110 of the inner cavity into the air intake region 111 and the air return region 112 that are isolated from each other, the heat dissipation duct 210 in the battery module 200 is an only duct through which cooling gas can flow from the air intake region 111 to the air return region 112. In this case, the cooling gas supplied by the cyclic cooling unit 30 can completely flow into the air return region 112 through the heat dissipation duct 210. This can effectively improve a heat dissipation effect of the battery module 200 in the energy storage apparatus 300. In addition, due to separation of the support 20 and the battery modules 200, gas with a high temperature in the air return region 112 is not easy to flow back to the air intake region 111. In other words, a temperature of cooling gas in the air intake region 111 may not be affected. In this way, a cooling effect on the battery module 200 is ensured. According to the energy storage apparatus 300, a working temperature of the battery module 200 can be better controlled, working reliability of the battery module 200 can be ensured, and a service life of the battery module 200 can be further prolonged.

In FIG. 14, the cyclic cooling unit 30 and the air intake region 111 are disposed on two opposite sides of the air return region 112 in the second direction 002, and the air supply duct 40 is located on a top of the support 20. The air supply duct 40 crosses the support 20 in the second direction 002 and communicates with the air inlet vent 301 and the air intake region 111. A top of the first region 110 may be configured to form the air supply duct 40. Cooling air flows from a side that is of the support 20 and that is away from the cyclic cooling unit 30 in a top-down direction, and gradually flows back to the air return region 112 through the heat dissipation duct 210 of the battery module 200. In this embodiment, the air supply duct 40 is disposed at a top position of the inner cavity. This can lower a height of the support 20, and facilitate installation, dismantlement, and maintenance of the battery module 200 on the support 20.

As shown in FIG. 11 to FIG. 13 and FIG. 15, the first support 21, the second support 22, and several battery modules 200 carried by each of the first support 21 and the second support 22 may be disposed in the first region 110 of the inner cavity. A single support 20 and battery modules 200 carried by the support 20 can separate the first region 110 into two independent regions. When two supports 20 are disposed in the first region 110, and the two supports 20 are disposed at intervals, a first air return region 112*a* is formed between the first support 21 and the first side wall 101, and a second air return region 112*b* is formed between the second support 22 and the second side wall 102. An air intake region 111 is formed between the first support 21 and the second support 22. The air intake region 111 may be a region shared by the first support 21 and the second support 22. Cooling gas with a low temperature may flow from the air intake region 111 to both the first air return region 112*a* and the second air return region 112*b*.

Correspondingly, in the embodiment shown in the figure, the cyclic cooling unit 30 includes a first cyclic cooling unit 31 and a second cyclic cooling unit 32. The first cyclic cooling unit 31 and the second cyclic cooling unit 32 are disposed on two opposite sides of the cabinet 10 in the second direction 002 and are both fastened to the cabinet 10. The first cyclic cooling unit 31 is located on a side that is of the first support 21 and that is away from the second support 22, and the second cyclic cooling unit 32 is located on a side that is of the second support 22 and that is away from the first support 21. An air return vent 302 of the first cyclic cooling unit 31 may recover gas in the first air return region 112*a* through the first side wall 101. An air return vent 302 of the second cyclic cooling unit 32 may recover gas in the second air return region 112*b* through the second side wall 102.

The air supply duct 40 includes a first air supply duct 41 and a second air supply duct 42. The first air supply duct 41 is disposed across the top of the first support 21 and communicates with an air inlet vent 301 of the first cyclic cooling unit 31 and the air intake region 111. The second air supply duct 42 is disposed across the top of the second support 22 and communicates with an air inlet vent 301 of the second cyclic cooling unit 32 and the air intake region 111. In other words, the first cyclic cooling unit 31 and the second cyclic cooling unit 32 share the air intake region 111. Steams of cooling gas supplied by the two cyclic cooling units 30 are converged in the air intake region 111, and then respectively flow into the first air return region 112*a* and the second air return region 112*b*.

In the solution of disposing the two symmetrical supports 20 in the second direction 002, in comparison with the structure shown in FIG. 14, an overall size of the energy storage apparatus 300 may be further reduced in a manner of sharing the air intake region 111. In the length direction (the first direction 001) of the cabinet 10, a support 20 and battery modules 200 may be successively arranged in the first direction 001, and a plurality of cyclic cooling units 30 may be arranged accordingly in the energy storage apparatus 300 based on a quantity of actually used battery modules 200. The air supply duct 40 may be correspondingly disposed with a plurality of sub-ducts 43, and the plurality of sub-ducts 43 are arranged side by side in the first direction 001. Each sub-duct 43 is configured to cooperate with one cyclic cooling unit 30 to supply, to the air intake region 111, cooling gas supplied by the cyclic cooling unit 30. Each sub-duct 43 correspondingly communicates with one cyclic cooling unit 30. This structure ensures that cooling gas supplied by each cyclic cooling unit 30 is transported to a region near the air intake region 111. The plurality of cyclic cooling units 30 can provide more cooling gas, and a flow distance is reduced before cooling gas enters the battery module 200. This ensures a low temperature of the cooling gas.

Refer to a structure of the cyclic cooling unit 30 shown in FIG. 16. In an embodiment, the cyclic cooling unit 30 includes an internal air duct T1 and an external air duct T2. Two opposite ends of the internal air duct T1 are the air inlet vent 301 and the air return vent 302. Cooling gas in the cyclic cooling unit 30 flows from the air return vent 302 to the air inlet vent 301 through the internal air duct T1, to implement circulation of the cooling gas in the inner cavity in the internal air duct T1. The external air duct T2 exchanges heat with the internal air duct T1, to cool the cooling gas flowing from the air return vent 302 to the internal air duct T1. Gas flowing in the external air duct T2 is gas outside the energy storage apparatus 300. In some embodiments, a cooling component such as a compressor (not shown in the figure) may be further disposed in the cyclic cooling unit 30, to further cool the cooling gas in the internal air duct T1.

As shown in FIG. 17, the air inlet vent 301 is located above the air return vent 302, and the air supply duct 40 communicates with the air inlet vent 301. With reference to FIG. 18, the cooling gas supplied from the air inlet vent 301 enters the air intake region 111 through the air supply duct 40. The air supply duct 40 shown in FIG. 18 includes a fixed section 401 and a movable section 402. The movable section 402 is located between the air inlet vent 301 and the fixed section 401. In other words, the movable section 402 communicates with the air inlet vent 301 and the fixed section 401. The cyclic cooling unit 30 may be fastened on the cabinet door 11 of the cabinet 10 in this embodiment. The cyclic cooling unit 30 needs to move (rotate in this embodiment) with the cabinet door 11 relative to the cabinet 10 for performing an operation on the battery module 200 and the support 20 after the cabinet door 11 is opened. Therefore, the movable section 402 may be fastened to the cabinet door 11, so as to ensure that relative positions of the movable section 402 and the air inlet vent 301 are stable. In this case, the movable section 402 may move synchronously with the cabinet door 11 and the cyclic cooling unit 30, and the movable section 402 and the fixed section 401 may form separable structures.

The fixed section 401 is fastened on the top of cabinet 10. The fixed section 401 includes a docking hatch 4011 and an air deflection end 4012. The docking hatch 4011 is nearer the movable section 402 than the air deflection end 4012. The docking hatch 4011 is configured to fit the movable section 402 and is in an interconnection mode with the movable section 402 when the cabinet door 11 is closed. FIG. 19 shows a fitting structure of the docking hatch 4011 and the movable section 402. FIG. 20 and FIG. 21 respectively show a structure of the docking hatch 4011 and a structure of the movable section 402. A sealing strip (not shown in the figure) may be further disposed between the docking hatch 4011 and the movable section 402. When the docking hatch 4011 and the movable section 402 are interconnected, this structure implements a sealed connection function between the docking hatch 4011 and the movable section 402. In this way, overall air-tightness of the air supply duct 40 is ensured, and unnecessary leakage and losses of cooling gas are avoided. Due to a moving fitting form of the docking hatch 4011 and the movable section 402, size precision between the docking hatch 4011 and the movable section 402 is difficult to control. Therefore, the sealing strip may be disposed around a periphery of a surface on which the docking hatch 4011 fits the movable section 402, to achieve the foregoing effect. It may be understood that a structure of the sealing strip may be separately disposed on a side that is of the docking hatch 4011 and that faces the movable section 402, or a side that is of the movable section 402 and that faces the docking hatch 4011. In some embodiments, the structure of the sealing strip may be disposed on both the docking hatch 4011 and the movable section 402, to enhance sealing performance when the docking hatch 4011 fits the movable section 402.

For a side on the air deflection end 4012, refer to FIG. 22. FIG. 22 shows an arrangement form of air deflection ends 4012 of two adjacent sub-ducts 43. A side air deflector plate 44 is disposed in the air supply duct 40 between the two adjacent sub-ducts 43. The side air deflector plate 44 is configured to separate the two sub-ducts 43, to avoid a phenomenon of cooling gas exchange between the two adjacent sub-ducts 43. As mentioned above, a shorter distance of cooling gas flowing in the air supply duct 40 is favorable for maintaining a low temperature of the cooling gas. This achieves a better heat dissipation effect on the battery module 200. A structure of two side-by-side air deflection ends 4012 is formed by disposing the side air deflector plate 44 between the two sub-ducts 43.

As shown in FIG. 23, a mixed-flow fan 51 may be further disposed between the two adjacent sub-ducts 43. The mixed-flow fan 51 may be disposed on the side air deflector plate 44, and a hole allowing cooling gas to pass through is formed between the two sub-ducts 43. The mixed-flow fan 51 is bidirectionally rotatable. When the mixed-flow fan 51 rotates in one rotation direction, cooling gas in one sub-duct 43 may be supplied to the other sub-duct 43. When the mixed-flow fan 51 rotates in the other rotation direction, cooling gas in the other sub-duct 43 may be supplied to the one sub-duct 43. In this way, an effect of actively controlling cooling gas exchange between the two adjacent sub-ducts 43 is achieved.

The mixed-flow fan 51 may be electrically connected to the controller 310, and both a rotation direction and a rotation speed of the mixed-flow fan 51 are controlled by the controller 310. This embodiment may correspond to a scenario in which two adjacent cyclic cooling units 30 have different cooling effects. For example, when one of the two adjacent cyclic cooling units 30 is faulty, cooling gas in a sub-duct 43 corresponding to a cyclic cooling unit 30 that is not faulty may be supplied to the other sub-duct 43 by using the mixed-flow fan 51. In addition, the sub-duct 43 receiving the cooling gas may supply an amount of cooling gas toward the air intake region 111, to ensure a low temperature of the cooling gas in the air intake region 111. In this way, a heat dissipation effect of a battery module 200 in the region is not significantly degraded due to the faulty cyclic cooling unit 30.

In some other application scenarios, for example, when the energy storage apparatus 300 is in an environment with a low temperature, and cooling gas required by the battery module 200 flows slowly, the controller 310 may actively control a part of cyclic cooling units 30 to stop working, and a remaining part of cyclic cooling units 30 to keep working. In this case, a temperature of entire cooling gas in the air intake region 111 is balanced through rotation of the mixed-flow fan 51.

An application scenario of the mixed-flow fan 51 may further correspond to an embodiment in which a region temperature measurement unit (not shown in the figure) may be further disposed in the air intake region 111. The region temperature measurement unit is configured to: detect real-time temperatures of regions in the air intake region 111 corresponding to different sub-ducts 43 and transfer the real-time temperature of each region to the controller 310. After receiving the real-time temperature of each region, the controller 310 determines whether a temperature difference between different regions meets a preset threshold. When the temperature difference between different regions exceeds the preset threshold, the mixed-flow fan 51 may be controlled to rotate, so as to transport more cooling gas toward a sub-duct 43 corresponding to a region with a high temperature. In this way, a temperature of overall cooling gas in the air intake region 111 is balanced, temperature consistency of the cooling gas in the air intake region 111 is ensured, and heat dissipation effects achieved by all battery modules 200 tend to be consistent.

In a position that is of a sub-duct 43 and that is near the air intake region 111, refer to the embodiment in FIG. 22. A structure of a first air deflector plate 451 is disposed in the first air supply duct 41, and a structure of a second air deflector plate (not shown in the figure) is disposed in the second air supply duct 42. An air deflection end 4012 of the first air supply duct 41 and an air deflection end 4012 of the second air supply duct 42 are disposed on two opposite sides of the air intake region 111. When cooling gas in the first air supply duct 41 flows into the air intake region 111 from the air deflection end 4012 of the first air supply duct 41, the cooling gas may further flow toward a direction of the second air supply duct 42 due to inertia. In other words, the cooling gas in the first air supply duct 41 may be poured back into the second air supply duct 42, causing an unnecessary loss of the cooling gas. After the structures of the first air deflector plate 451 and the second air deflector plate are disposed, the second air deflector plate may prevent cooling gas supplied from the first air supply duct 41 from entering the second air supply duct 42. On the contrary, the first air deflector plate 451 may also prevent cooling gas supplied from the second air supply duct 42 from entering the first air supply duct 41. In other words, in the embodiment in which the first support 21 and the second support 22 are disposed, the structures of the first air deflector plate 451 and the second air deflector plate may ensure that the cooling gas enters the air intake region 111. This improves a heat dissipation effect of the energy storage apparatus 300.

As shown in FIG. 11, and structures shown in FIG. 24 and FIG. 25, an eliminating vane 46 may be further disposed between the first air supply duct 41 and the second air supply duct 42. The eliminating vane 46 is located on the top of the air intake region 111 and includes a first air deflection side 461 and a second air deflection side 462. The first air deflection side 461 is fastened to a side near the first air supply duct 41. The first air deflection side 461 is constructed as an arc in an air supply direction parallel to the first air supply duct 41, and a curved surface extends to a direction (vertically downward in this embodiment) toward the air intake region 111. Cooling gas supplied from the first air supply duct 41 toward the air intake region 111 may be diverted after being directed by the first air deflection side 461, so that the cooling gas entering the air intake region 111 flows in a preset direction. In this way, a battery module 200 near the bottom of the air intake region 111 may also receive an amount of cooling gas, and it is ensured that overall heat dissipation effects of battery modules 200 tend to be consistent. In addition, the first air deflection side 461 also avoids a turbulence phenomenon formed in the air intake region 111 due to an excessively large change in an angle of a flow path or convergence of two paths of cooling gas in a process in which the cooling gas enters the air intake region 111. Smoothly flowing cooling gas helps improve cooling efficiency.

The second air deflection side 462 is disposed away from the first air deflection side 461, is fastened to a side near the second air supply duct 42 and is also constructed as an arc. It may be understood that the second air deflection side 462 is also configured to implement a directing function for the cooling gas supplied from the second air supply duct 42, to prevent turbulence formed in a flow process of the cooling gas supplied from the second air supply duct 42 and improve efficiency of the cooling gas. An eliminating vane 46 having only one air deflection side may be introduced in the embodiment in which there is only one support 20 shown in FIG. 14, to direct cooling gas supplied from a one-side air supply duct 40.

FIG. 26 shows a structure of a battery module 200 in an energy storage apparatus 300. The battery module 200 may have a substantially rectangular structure and an air outlet surface 202. Air outlet holes 212 are disposed on the air outlet surface 202. When the battery module 200 is fastened on the support 20, the air outlet surface 202 is located on a side facing the air return region 112. The air outlet holes 212 are constructed as an air outlet end of the heat dissipation duct 210 in the battery module 200, and cooling gas in the heat dissipation duct 210 may flow into the air return region 112 through the air outlet holes 212. An air inlet end that is of the heat dissipation duct 210 and that is away from the air outlet end may be disposed on any side surface of the battery module 200 other than the air outlet surface 202. At least a part of the side surface is located in the air intake region 111, and the air inlet end is also located in the air intake region 111. In this way, cooling gas in the air intake region 111 can flow from the air inlet end of the heat dissipation duct 210, and then flow into the air return region 112 through the air outlet end (the air outlet holes 212).

In an embodiment, the entire battery module 200 may be located in the air intake region 111. The air outlet surface 202 of the battery module 200 is disposed only toward the air return region 112, so that cooling gas in the heat dissipation duct 210 can flow into the air return region 112. Air inlet holes 211 constructed as an air inlet end are disposed on an air inlet surface 201 (refer to FIG. 27) that is of the battery module 200 and that is away from the air outlet surface 202, and/or four side surfaces 203 connected between the air inlet surface 201 and the air outlet surface 202 of the battery module 200. As shown in FIG. 26 and FIG. 27, air inlet holes 211 may be disposed on outer surfaces of the battery module 200 other than the air outlet surface 202. Each air inlet hole 211 communicates with the inside of the battery module 200 and communicates with the air outlet hole 212 through the inside of the battery module 200. In this embodiment, when a plurality of battery modules 200 are fastened on the support 20, the plurality of battery modules 200 need to be disposed at intervals. In this way, the air inlet surface 201 and the four side surfaces 203 of the battery module 200 each are exposed in the air intake region 111, and cooling gas in the air intake region 111 may flow into the heat dissipation duct 210 through each air inlet hole 211.

Based on an internal structure of the battery module 200, the air inlet hole 211 may be randomly disposed at a position on each side surface 203 and the air inlet surface 201. For example, four electrochemical cells (not shown in the figure) are stacked in the battery module 200 shown in FIG. 26 and FIG. 27. Three heat dissipation gaps are formed between the four stacked electrochemical cells. Therefore, the air inlet holes 211 are disposed in three rows on each of two side surfaces 203 and the air inlet surface 201 of the battery module 200. Each row of air inlet holes 211 may be aligned with one heat dissipation gap, so that cooling gas flowing into the battery module 200 through the air inlet holes 211 can directly pass through the three heat dissipation gaps and flow into the air outlet holes 212. Air inlet holes 211 on an upside surface 203 and a downside surface 203 of the battery module 200 are disposed near the air inlet surface 201. Cooling gas flowing from the air inlet holes 211 into the battery module 200 flows to the air outlet holes 212 through a long path. This can provide a better heat dissipation effect for the inside of the battery module 200

In an embodiment, refer to FIG. 8 and FIG. 9. A baffle plate 23 is further disposed between the battery module 200 and the support 20. The baffle plate 23 is configured to: cover a gap between the battery module 200 and the support 20 and implement relative sealing isolation between the air intake region 111 and the air return region 112. In this way, cooling gas in the air return region 112 is prevented from flowing back to the air intake region 111, and a heat dissipation effect of the cooling gas is ensured. FIG. 28a, FIG. 28b, and FIG. 28c show structures of several types of baffle plates 23. The types of baffle plates 23 are distributed at different positions of the support 20, to seal and isolate gaps between the support 20 and the battery module 200 at corresponding positions. It may be understood that a structure of the baffle plate 23 may be randomly disposed based on a shape requirement of an actual position, to achieve a similar beneficial effect. This is not limited in the embodiments.

FIG. 29 and FIG. 30 respectively show an upper component structure and a lower component structure of the second region 120 of the inner cavity. A power conversion module 311 in the controller 310 may be disposed, corresponding to the positions of the three vent sash 12, in an upper part of the second region 120. As shown in FIG. 31, an airflow duct 3111 is disposed in the power conversion module 311. The airflow duct 3111 passes through a length direction of the power conversion module 311 and works with a blower unit (not shown in the figure) disposed in the second region 120. In this way, external air flows into the airflow duct 3111 through a vent sash 12 on one side, and then flows out of the airflow duct 3111 through a vent sash 12 on another side, to implement a heat dissipation function of the power conversion module 311.

In the upper component structure of the second region 120 shown in FIG. 29, the cabinet 10 is constructed by using a hollowed-out frame structure, and air may flow freely in the frame structure. The power conversion modules 311 may be disposed in two vertical columns One column of vertically stacked power conversion modules 311 are located near the first side wall 101, and the other column of vertically stacked power conversion modules 311 are located near the second side wall 102. In addition, the length direction of the power conversion module 311 is arranged along the second direction 002, and the blower unit is located between the two columns of power conversion modules 311. The blower unit may blow air toward a vent sash 12 on the fourth side wall 104. In this way, external air flows into the upper part of the second region 120 through a vent sash 12 on the first side wall 101 and a vent sash 12 on the second side wall 102 and flows through airflow ducts 3111 on the same sides of the vent sashes 12. Heat dissipation is performed on columns of power conversion modules 311 on the same sides of the vent sashes 12, and then the air is converged at a position near the blower unit. The converged air may flow toward the fourth side wall 104 with a blowing action of the blower unit, and finally flow out of the upper part of the second region 120 through the vent sash 12 on the fourth side wall 104.

Further, the energy storage apparatus 300 may further include a cooling unit for a power distribution system (not shown in the figure). The cooling unit for the power distribution system is also located outside the cabinet 10 and is disposed corresponding to the second region 120. The cooling unit for the power distribution system may be configured to provide cooling gas for the upper part and/or lower part of the second region 120. That is, air flowing into the upper part of the second region 120 through the vent sashes 12 on the first side wall 101 and the second side wall 102 may be replaced with cooling gas supplied by the cooling unit for the power distribution system.

With reference to FIG. 32, a direct current distribution unit 312, a switch unit 313, a power switch unit 314, and a fire controller 315 are arranged in the lower part of the second region 120 shown in FIG. 30. A fire extinguishing component, such as a fire extinguisher 316 and a fire extinguishing pipe 317, may be further disposed in a region near the fire controller 315. The fire extinguishing pipe 317 may be connected to fire extinguishing devices outside the cabinet 10. A plurality of air deflection separators 16 may be disposed in the lower part of the second region 120, and the air deflection separator 16 may implement region isolation between components, and direct flow of cooling gas. When being directed by the air deflection separators 16, the cooling gas supplied by the cooling unit for the power distribution system may successively flow through the fire controller 315, the power switch unit 314, the switch unit 313, and the direct current distribution unit 312, and finally flow back to the cooling unit for the power distribution system for cyclic cooling.

In this embodiment, the second region 120 and the first region 110 are independent of each other. Therefore, cyclic cooling can be separately performed on the controller 310 in a power distribution region when the second region 120 works with the cooling unit for the power distribution system. This ensures a cooling effect of each component in the controller 310.

In an embodiment, a ventilation duct (not shown in the figure) may be further disposed on the separator 15 configured to separate the inner cavity into the first region 110 and the second region 120. The ventilation duct may be configured to communicate with the first region 110 and the second region 120. In this embodiment, a position of the ventilation duct needs to correspond to the upper part of the second region 120, so that the ventilation duct can communicate with the outside of the cabinet 10 through the vent sash 12 in the upper part. In addition, the position of the ventilation duct further needs to correspond to the air outlet ventilation casement 13 on the third side wall 103, so that the ventilation duct can communicate with the air outlet ventilation casement 13 through the air intake region 111 or the air return region 112 in the first region 110. Therefore, in the length direction (the first direction 001) of the cabinet 10, a vent sash 12 near or on the fourth side wall 104 can communicate with the air outlet ventilation casement 13 through the ventilation duct and the air intake region 111 (or the air return region 112). In other words, an airflow path passing through the inner cavity of the cabinet 10 is formed in the length direction. In this case, the vent sash 12 forming the airflow path may be considered as an air inlet ventilation casement of the cabinet 10.

The airflow path can ensure air circulation in the inner cavity of the cabinet 10 when necessary. In other words, when the energy storage apparatus 300 encounters an accident such as a fire, air circulation may be forced to be implemented through the airflow path from the air inlet ventilation casement to the air outlet ventilation casement 13, to implement fire protection. Because the inner cavity of cabinet 10 is sealed, cooling gas flows through only the heat dissipation duct 210 of the battery module 200. When the energy storage apparatus 300 encounters an accident such as a fire, an airflow volume of the heat dissipation duct 210 cannot meet an air exchange requirement in the cabinet 10. As a result, the energy storage apparatus 300 may fail to implement fire protection. However, a structure of the airflow path may work with an air supply function of an air supply unit 17 (refer to FIG. 33) disposed in the inner cavity of the cabinet 10, to form a larger airflow volume in the airflow path, to implement fire protection of the energy storage apparatus 300. In addition, because the airflow path passes through the inner cavity of the cabinet 10 in the length direction of the cabinet 10, air circulating in the airflow path can flow in a larger area of the inner cavity, to better implement fire protection.

It may be understood that an air supply direction of the air supply unit 17 in this embodiment may be a direction from the vent sash 12 to the air outlet ventilation casement 13 or may be a direction from the air outlet ventilation casement 13 to the vent sash 12. During air supply, the air supply unit 17 can exchange air for the inner cavity of the cabinet 10 through the airflow path. As shown in FIG. 33, the air supply unit 17 may be accommodated in the air intake region 111 and fastened near the air outlet ventilation casement 13. The air supply unit 17 may alternatively be fastened near the ventilation duct. In some embodiments, the air supply unit 17 may alternatively be disposed, corresponding to a position of the air ventilation duct, in the second region 120. The air supply unit 17 may alternatively be disposed, corresponding to a position of the air outlet ventilation casement 13, outside the cabinet 10. Any unit that can achieve a ventilation effect on the airflow path may be used as an implementation of the air supply unit 17.

As shown in FIG. 33, the air outlet ventilation casement 13 is implemented in a form of a louver. The air outlet ventilation casement 13 may have an open state and a closed state. FIG. 33 shows a structure when the air outlet ventilation casement 13 is in the open state, and FIG. 34 shows a structure when the air outlet ventilation casement 13 is in the closed state. When the energy storage apparatus 300 works normally, the air outlet ventilation casement 13 should be in the closed state. The air outlet ventilation casement 13 communicates with the air intake region 111 or the air return region 112, and cooling gas used for cooling and heat dissipation flows in the region. In this case, the air outlet ventilation casement 13 is controlled to be in the closed state. This can ensure that the cooling gas flows through the heat dissipation duct 210 of each battery module 200 for heat dissipation. In addition, external air is prevented from entering the first region 110 and causing unnecessary heat exchange with the cooling gas. When the foregoing accident occurs, and the inner cavity of the cabinet 10 needs to be ventilated, the air outlet ventilation casement 13 is controlled to switch to the open state, to ensure good ventilation of the airflow path.

It may be understood that the ventilation duct on the separator 16 may be disposed with reference to a manner of disposing the air outlet ventilation casement 13. A structure similar to a louver may also be disposed at a position of the ventilation duct and may have an open state and a closed state. The ventilation duct communicates with the first region 110 and the second region 120, and air circulation is implemented between the second region 120 and the outside through the vent sash 12. Therefore, status switching of the ventilation duct helps control a heat dissipation effect of the battery module 200.

The two statuses of the air outlet ventilation casement 13 may be switched in many manners. For example, the controller 310 controls opening or closing of the air outlet ventilation casement 13 in a form of an electric louver. Alternatively, the controller 310 controls opening or closing of the air outlet ventilation casement 13 in a form of a solenoid valve. The manners may be all applied to the energy storage apparatus 300. In solutions shown in FIG. 33 and FIG. 34, the air outlet ventilation casement 13 may alternatively be implemented in a form of a gravity louver. A plurality of blades 131 may be disposed in the air outlet ventilation casement 13, and the blades 131 may be disposed obliquely relative to a vertical direction at intervals. The blades 131 are rotationally connected to an outer frame of the air outlet ventilation casement 13, and the air outlet ventilation casement 13 implements switching between the open state and the closed state by synchronously rotating the blades 131.

When an included angle between the blade 131 and the vertical direction is small (as shown in FIG. 34), two adjacent blades 131 are in contact with each other, and a gap for air circulation at a position of the air outlet ventilation casement 13 is small. In this case, the air outlet ventilation casement 13 is in the closed state. When an included angle between the blade 131 and the vertical direction is large (as shown in FIG. 33), a gap between two adjacent blades 131 becomes large, and a large airflow path is formed. In this case, the air outlet ventilation casement 13 is in the open state.

Further, the blade 131 may be divided into an upwind blade 1311 and a downwind blade 1312 along extension of a rotation axis. The upwind blade 1311 is located relatively above the rotation axis of the blade 131, and the downwind blade 1312 is located relatively below the rotation axis of the blade 131. Further, a weight of the downwind blade 1312 is set to be greater than a weight of the upwind blade 1311. In this case, the downwind blade 1312 is naturally in a droop posture and drives the entire blade 131 to rotate toward a position near the vertical direction. The included angle between the blade 131 and the vertical direction is small. In other words, a weight difference is set between the downwind blade 1312 and the upwind blade 1311 in this embodiment, so that the air outlet ventilation casement 13 is naturally in the closed state.

When the air outlet ventilation casement 13 needs to be opened, the air supply unit 17 fastened to a side of the air outlet ventilation casement 13 can be controlled to rotate, and a large atmospheric pressure is formed at the air outlet ventilation casement 13. Under action of the atmospheric pressure, the blade 131 can overcome the weight difference between the downwind blade 1312 and the upwind blade 1311 and rotate toward a position away from the vertical direction. In this way, the included angle between the blade 131 and the vertical direction becomes large, and the air outlet ventilation casement 13 is switched to the open state. This implements an air circulation function between the inside and the outside of the cabinet 10.

The foregoing descriptions are merely embodiments, but are not intended to limit the scope of the embodiments. Any variation or replacement, for example, reducing or adding a mechanical part, and changing a shape of a mechanical part, readily figured out by a person skilled in the art shall fall within the scope of the embodiments. When no conflict occurs, the embodiments and the features in the embodiments may be mutually combined.

What is claimed is:

1. An energy storage apparatus, comprising
   a cabinet;
   cyclic cooling units;
   a support;

battery modules; and an air supply duct, wherein the support is fastened in an inner cavity of the cabinet, the battery modules are fastened on the support, the support and the battery modules jointly separate the inner cavity into an air intake region and an air return region, a heat dissipation duct is disposed in the battery module, and the heat dissipation duct communicates with the air intake region and the air return region; the cyclic cooling unit is located outside the cabinet and is nearer the air return region than the air intake region, the cyclic cooling unit comprises an air inlet vent and an air return vent, one end of the air supply duct communicates with the air inlet vent, and the other end of the air supply duct communicates with the air intake region, and the air return vent communicates with the air return region; and the cyclic cooling unit is configured to supply cooling gas from the air inlet vent, wherein the cooling gas successively passes through the air supply duct, the air intake region, the heat dissipation duct, and the air return region, and finally flows back to the cyclic cooling unit from the air return vent, wherein the cyclic cooling unit and the air intake region are disposed on two opposite sides of the air return region, and the air supply duct is disposed across a top of the support and communicates with the air inlet vent and the air intake region, wherein the support further comprises:

a first support and a second support, the first support and the second support are disposed at intervals, the battery modules are fastened on each of the first support and the second support, and the air intake region is formed between the first support and the second support; and the air return region further comprises:

a first air return region and a second air return region, the first air return region is located on a side that is of the first support and that is away from the second support, and the second air return region is located on a side that is of the second support and that is away from the first support; the cyclic cooling units further comprise:

a first cyclic cooling unit and a second cyclic cooling unit, the first cyclic cooling unit is located outside the first air return region, and the second cyclic cooling unit is located outside the second air return region; and the air supply duct further comprises:

a first air supply duct and a second air supply duct, the first air supply duct communicates with an air inlet vent of the first cyclic cooling unit and the air intake region, and the second air supply duct communicates with an air inlet vent of the second cyclic cooling unit and the air intake region.

2. The energy storage apparatus according to claim 1, wherein the first air supply duct further comprises:

a first air deflector plate located at an exit of the first air supply duct near the air intake region that is configured to prevent cooling gas supplied from the second air supply duct from entering the first air supply duct; and/or the second air supply duct further comprises:

a second air deflector plate located at an exit of the second air supply duct near the air intake region and configured to prevent cooling gas supplied from the first air supply duct from entering the second air supply duct.

3. The energy storage apparatus according to claim 1, wherein the air supply duct further comprises:

an eliminating vane located at a top of the air intake region and between the first air supply duct and the second air supply duct and configured to direct cooling gas so that the cooling gas flowing out of the first air supply duct and the second air supply duct enters the air intake region.

4. The energy storage apparatus according to claim 3, wherein the eliminating vane includes a first air deflection side fastened to a side near the first air supply duct, and a second air deflection side fastened to a side near the second air supply duct.

5. The energy storage apparatus according to claim 4, wherein the first air deflection side and the second air deflection side are curved in a vertically downward direction toward the air intake region.

6. The energy storage apparatus according to claim 1, wherein a power distribution region is further disposed in the inner cavity of the cabinet, the energy storage apparatus further comprises:

a controller and a cooling unit for a power distribution system, the power distribution region is located on one side of the support and is separated from both the air intake region and the air return region, the controller is accommodated in a control region and is configured to control working of each battery module, the cooling unit for the power distribution system corresponds to a position of the power distribution region and is fastened outside the cabinet, and the control cooling unit for the power distribution system is configured to perform cyclic cooling for the control region.

7. The energy storage apparatus according to claim 6, wherein the cabinet further comprises an air inlet ventilation casement, an air outlet ventilation casement, and an air supply unit, wherein the air inlet ventilation casement and the air outlet ventilation casement are located at two opposite ends of the cabinet and each communicate with the air intake region, the air supply unit is located at the air inlet ventilation casement, and/or the air outlet ventilation casement, and is configured to implement ventilation in the air intake region.

8. The energy storage apparatus according to claim 7, wherein the air inlet ventilation casement and the air outlet ventilation casement each have an open state and a closed state, and when the air supply unit works, both the air inlet ventilation casement and the air outlet ventilation casement are in the open state, or when the air supply unit does not work, both the air inlet ventilation casement and the air outlet ventilation casement are in the closed state.

9. The energy storage apparatus according to claim 1, further comprising a baffle plate disposed between the battery module and the support and configured to cover a gap between the battery modules and the support.

10. The energy storage apparatus according to claim 1, wherein the cabinet further comprises:

a cabinet door, the cyclic cooling unit is fastened on the cabinet door, the air supply duct further comprises:

a fixed section and a movable section, the fixed section is fastened on the top of the support, and the movable section is fastened on the cabinet door and communicates with the air inlet vent.

11. The energy storage apparatus according to claim 1, wherein there are at least two cyclic cooling units disposed side by side in a first direction; and the air supply duct further comprises:

at least two sub-ducts disposed side by side in the first direction, and each sub-duct correspondingly communicates with an air inlet vent of one cyclic cooling unit.

12. The energy storage apparatus according to claim 11, wherein a mixed-flow fan is disposed between two adjacent sub-ducts and is bidirectionally rotatable; and the mixed-flow fan is configured to supply cooling gas in one sub-duct to the other sub-duct to balance temperatures of the two adjacent sub-ducts.

13. The energy storage apparatus according to claim 12, further comprising a region temperature measurement unit disposed in the air intake region and configured to detect a real time temperatures of the two adjacent subducts.

14. The energy storage apparatus according to claim 13, wherein a controller receives the real time temperatures of the two adjacent subducts and controls the mixed-flow fan to balance an overall temperature of the cooling gas in the air intake region.

15. The energy storage apparatus according to claim 1, wherein there are a plurality of battery modules, the plurality of battery modules is fastened on the support at intervals, the battery module further comprises:

an air outlet surface facing the air return region, the heat dissipation duct further comprises:
an air outlet end disposed on the air outlet surface.

16. The energy storage apparatus according to claim 15, wherein the battery module is rectangular, and the battery module further comprises:

an air inlet surface opposite to the air outlet surface, and four side surfaces connected between the air outlet surface and the air inlet surface; and the heat dissipation duct further comprises:
an air inlet end opposite to the air outlet end, and the air inlet end is located on the air inlet surface and/or the side surface.

\* \* \* \* \*